US005541981A

United States Patent [19]
Lynn

[11] Patent Number: 5,541,981
[45] Date of Patent: Jul. 30, 1996

[54] AUTOMATED ANNOUNCEMENT SYSTEM

[75] Inventor: Joe J. Lynn, Gaithersburg, Md.

[73] Assignee: Microlog Corporation, Germantown, Md.

[21] Appl. No.: 170,927

[22] Filed: Dec. 21, 1993

[51] Int. Cl.⁶ ............................. H04M 3/50; B61L 25/02
[52] U.S. Cl. .................. 379/67; 246/124; 379/88
[58] Field of Search ................... 379/67, 88, 89, 379/76, 157, 217, 101, 71, 72, 74, 77, 87; 360/12; 340/825.25, 825.31, 825.34

[56] References Cited

U.S. PATENT DOCUMENTS

| | | | |
|---|---|---|---|
| 3,889,291 | 6/1975 | Walker | 360/12 |
| 4,070,697 | 1/1978 | Miller et al. | 360/12 |
| 4,072,986 | 2/1978 | Heidergren | 379/88 |
| 4,101,742 | 7/1978 | Craig et al. | 179/100 |
| 4,228,470 | 10/1980 | Rahmin et al. | 379/157 |
| 4,276,572 | 6/1981 | Hayashi et al. | 360/12 |
| 4,307,859 | 12/1981 | Hayashi | 246/124 |
| 4,389,546 | 6/1983 | Glisson | 179/18 |
| 4,623,761 | 11/1986 | Winter | 379/84 |
| 4,625,081 | 11/1986 | Lotito | 379/88 |
| 4,636,880 | 1/1987 | Debell | 360/72.3 |
| 4,734,930 | 3/1988 | Quiros | 379/88 |
| 4,741,020 | 4/1988 | Deal et al. | 379/170 |
| 4,783,800 | 11/1988 | Levine | 379/67 |
| 4,817,086 | 3/1989 | Oye | 370/85 |
| 4,922,526 | 5/1990 | Morganstein et al. | 379/88 |
| 4,955,047 | 9/1990 | Morganstein | 379/112 |
| 4,961,215 | 10/1990 | Fernandez | 379/56 |
| 5,056,086 | 10/1991 | Libonati | 379/88 |
| 5,093,854 | 3/1992 | Sucato | 379/67 |
| 5,125,023 | 6/1992 | Morduch et al. | 379/88 |
| 5,172,111 | 12/1992 | Olivo | 340/825 |
| 5,367,560 | 11/1994 | Watanabe | 379/72 |

FOREIGN PATENT DOCUMENTS

| | | | |
|---|---|---|---|
| 54-14106 | 11/1979 | Japan. | |
| 54-141106 | 11/1979 | Japan | 360/12 |
| 61-26336 | 2/1986 | Japan. | |

OTHER PUBLICATIONS

R. A. Rahenkamp et al, "Central Message Control to Individuals", IBM Technical Disclosure Bulletin, vol. 9 No. 2, pg. 145 (Jul. 1966).

*Primary Examiner*—Jeffery Hofsass
*Assistant Examiner*—Thomas F. Presson
*Attorney, Agent, or Firm*—Roylance, Abrams, Berdo & Goodman, L.L.P.

[57] ABSTRACT

An automated announcement system allows messages to be played on a public address system and/or displayed on a display device in accordance with a predetermined schedule, which can be modified automatically to maintain a predetermined minimum interval between messages. Conflicts between messages to be played at the same time are detected and resolved by assigning priorities to messages based on deficits in the number of times each message has been played. Additional features of the automated announcement system include programmable control over announcement volume levels, the ability to input scheduling parameters which apply to specific announcements or to all announcements, the use of multi-level password protection to restrict specific system functions to authorized users, and an interface which allows live announcements to be made without interference from stored or recorded announcements.

56 Claims, 25 Drawing Sheets

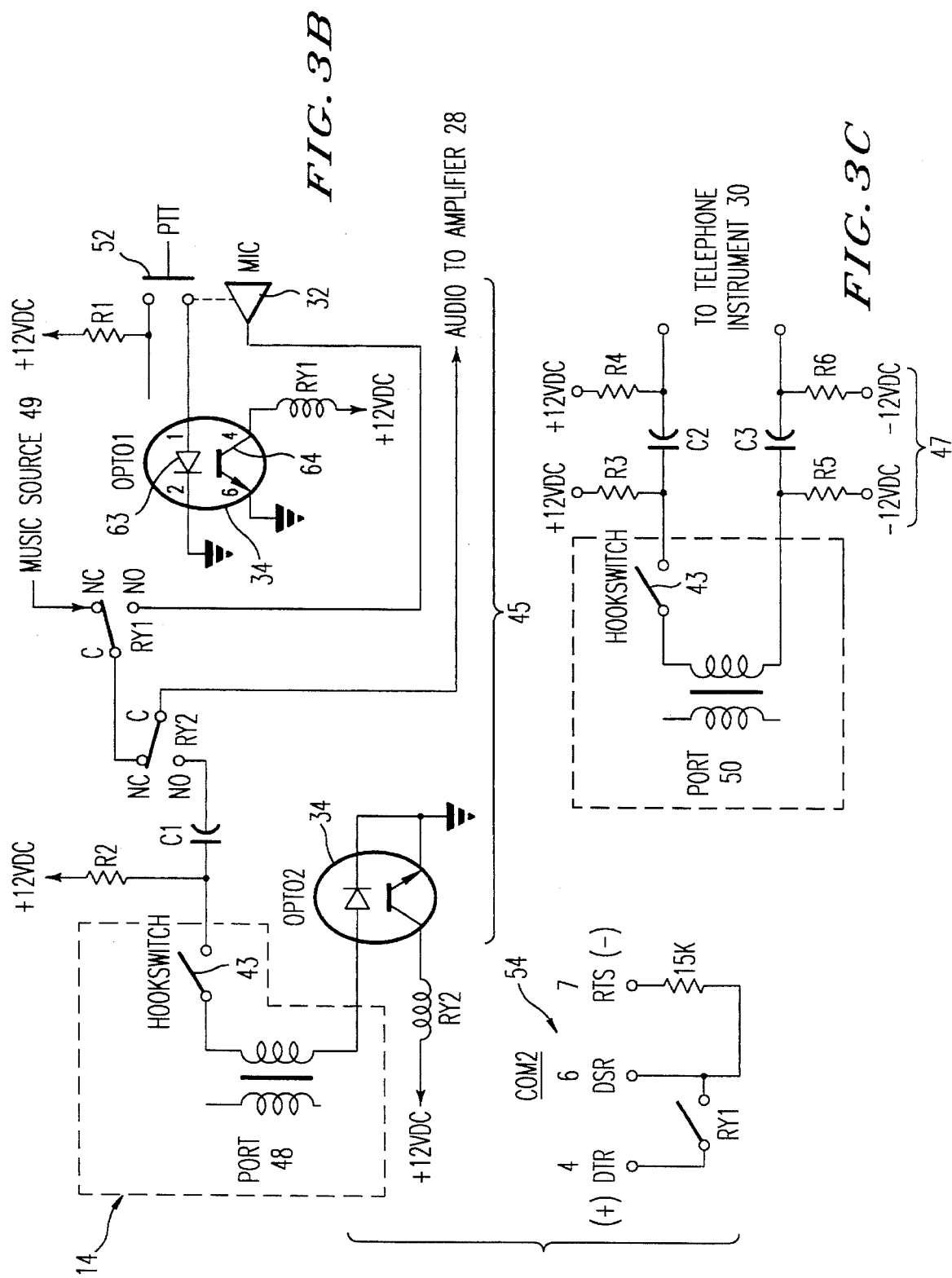

AUTOMATED ANNOUNCEMENT SYSTEM

BACKGROUND OF THE INVENTION

Various types of programmable announcement and reminder systems have been developed to play recorded audio messages at scheduled times or on scheduled dates. Examples include store announcement systems which use recorded announcements to inform customers of special sale events and other promotions (in some cases by interrupting background music that is normally played over store loudspeakers), and personal reminder systems which play recorded messages to remind the user of important dates or obligations. Generally, these systems utilize magnetic tape as the storage medium for the recorded messages, together with some type of memory or addressing system for advancing the tape to the proper position when a desired message is to be played. In some systems, messages are scheduled to be played at specific times or on specific days, while in other systems messages are played at predetermined intervals throughout the day. In the latter type of system, the interval between successive messages may be variable.

In the relatively simple types of programmable announcement and reminder systems described above, the possibility of conflicts between messages which are scheduled to be played at the same time does not ordinarily arise. In some systems, for example, fixed time slots are provided for the recorded messages, either on the magnetic tape itself or in the memory or control circuitry used to control the movement of the tape. Since a time slot assigned to one message ordinarily cannot be used for another, conflicts or overlap between messages cannot occur. Although it is possible in some systems to schedule more than one message to be played during the same time slot, the messages are usually short enough that they can all be played in sequence during the same time slot without overlapping the next time slot. Again, therefore, the possibility of conflicts between messages is eliminated.

Although announcement and reminder systems of the types described above are useful in some instances, a need exists for a more versatile type of automated announcement system which allows for more flexible scheduling of announcements and is not constrained to operate with fixed time slots or short message lengths. For example, it may be desirable to schedule different announcements to occur at different intervals (e.g., every 10 minutes for one type of announcement and every hour for another type of announcement), and to begin and end these announcements at different times of the day. It may also be desirable to establish general scheduling parameters that apply to all announcements, such as a minimum time interval between successive announcements and a maximum number of announcements that can be stored at a given time. Moreover, it may be desirable to change these scheduling parameters from time to time. Under these circumstances, it may be difficult or impossible to anticipate and prevent conflicts between messages when the messages are initially recorded or scheduled.

Other features that would also be desirable in an automated announcement system are similarly not found in the systems proposed previously. For example, it may be desirable to require the use of security passwords to operate the system, so that only authorized users can record and schedule messages and perform other system functions. An extensive menu of scheduling and control options would also be desirable in order to provide users with maximum flexibility in scheduling individual announcements and in configuring the system as a whole to meet the demands of specific applications. It would be desirable to be able to connect an automated announcement system to an existing paging or public address system that allows live announcements to be made through a microphone or telephone, such as a conventional public address amplifier or a telephone private branch exchange (PBX), while avoiding interference between the live and recorded announcements. Finally, it would be desirable to have the capability of playing audio messages over a paging or public address system while providing corresponding information on a visual display, or to realize the flexible scheduling features of the above-mentioned audio announcement system in a system which only displays messages.

SUMMARY OF THE INVENTION

The foregoing disadvantages and limitations of the prior art are substantially avoided by the automated announcement system of the present invention. In one aspect, the invention relates to an automated announcement system which comprises a storage device for storing a plurality of recorded audio messages, an audio output device for playing selected ones of the recorded messages, and a programmable control device coupled to the storage device and to the audio output device for selecting individual ones of the recorded audio messages for playing by the audio output device in accordance with a predetermined schedule. The programmable control device is operable to modify the predetermined schedule in order to maintain a predetermined interval between messages played by the audio output device.

In another aspect, the present invention is directed to an automated announcement system comprising a storage device for storing a plurality of recorded audio messages, an audio output device for playing selected ones of the recorded audio messages, and a programmable control device coupled to the storage device and to the audio output device for selecting individual ones of the recorded audio messages for playing by the audio output device in accordance with predetermined scheduling parameters. The programmable control device is operable to establish a priority between conflicting messages that are to be played at the same time, and to selectively play or inhibit the playing of the conflicting messages in accordance with the established priority.

In accordance with a further aspect of the present invention, an automated announcement system comprises storage means for storing a plurality of recorded audio messages and volume level data related to the messages, and an audio output device for playing the recorded audio messages at a controllable volume level. The automated announcement system also comprises a programmable control device coupled to the storage means and to the audio output device for selecting the recorded audio messages for playing by the audio output device and for controlling the volume level of the messages in accordance with the stored volume level data.

In a still further aspect of the present invention, an automated announcement system comprises storage means for storing a plurality of recorded audio messages and desired scheduling parameters for playing the audio messages, with the scheduling parameters including a plurality of first scheduling parameters which are respectively applicable to individual ones of the recorded audio messages and second scheduling parameters which are applicable to all of the recorded audio messages. The automated announcement system further comprises an audio output device for playing selected ones of the recorded audio messages, and a programmable control device coupled to the storage device and to the audio output device for selecting individual ones of the recorded audio messages for playing by the audio output device in accordance with the scheduling parameters.

In accordance with a still further aspect of the present invention, an automated announcement system comprises a storage device for storing a plurality of audio messages, an audio output device for playing selected ones of the recorded audio messages, a programmable control device coupled to the storage device and to the audio output device for selecting individual ones of the recorded audio messages for playing by the audio output device, and an input device coupled to the programmable control device for programming the control device using control commands and passwords. The programmable control device is responsive to at least first and second different control commands, and to at least first and second different passwords. The first control command is recognized by the control device only after the first password has been entered using the input device, and the second control command is recognized by the control device only after the second password has been entered using the input device.

In accordance with yet another aspect of the present invention, an announcement system for playing recorded audio messages comprises a storage device for storing a plurality of recorded audio messages, an audio output device for playing selected ones of the recorded audio messages, and a control device coupled to the storage device and to the audio output device for selecting individual ones of the recorded audio messages for playing by the audio output device. A microphone is coupled to the audio output device for allowing a live announcement to be made using the audio output device, and an interface circuit is connected between the microphone and the control device for inhibiting the playing of a recorded audio message when the microphone is in use.

The present invention is also directed to novel methods for recording, scheduling, modifying and playing audio messages. These methods may be carried out using the exemplary apparatus disclosed and claimed herein.

In accordance with a still further aspect of the present invention, an automated announcement system comprises a storage device for storing a plurality of recorded messages which can be either digitized graphic or alphanumeric messages for display purposes or audio messages. The system can be provided with a display device for displaying selected ones of the recorded graphic messages in conjunction with or separately from an audio output device that plays selected ones of the recorded audio messages. A programmable control device is coupled to the storage device, the display device, and/or the audio output device, depending on whether the system is configured with one or both of these types of output devices.

The programmable control device is operable to synchronize the simultaneous playing of an audio message with a corresponding graphic message for display. The system operates to store, schedule, play, review and modify graphic messages in substantially the same way as for audio messages. For example, the programmable control device is operable to select individual ones of the graphic messages for viewing on the display device in accordance with a predetermined schedule. The programmable control device is further operable to modify the predetermined schedule to maintain a predetermined interval between graphic messages, to establish priority between conflicting messages that are to be displayed on the display device, and to selectively play or inhibit the displaying of conflicting graphic messages in accordance with the established priority. Methods for recording, scheduling, displaying, reviewing and modifying graphic messages can be carried out using the exemplary apparatus disclosed and claimed herein.

BRIEF DESCRIPTION OF THE DRAWINGS

The various advantages and novel features of the present invention will be more readily apprehended from the following detailed description when read in conjunction with the appended drawings, in which:

FIGS. 3A–3C are a more detailed block diagram of the automated announcement system of FIG. 1;

Throughout the drawings, like reference numerals will be understood to refer to like parts and components.

DETAILED DESCRIPTION OF THE PREFERRED EMBODIMENTS

Figure 1:
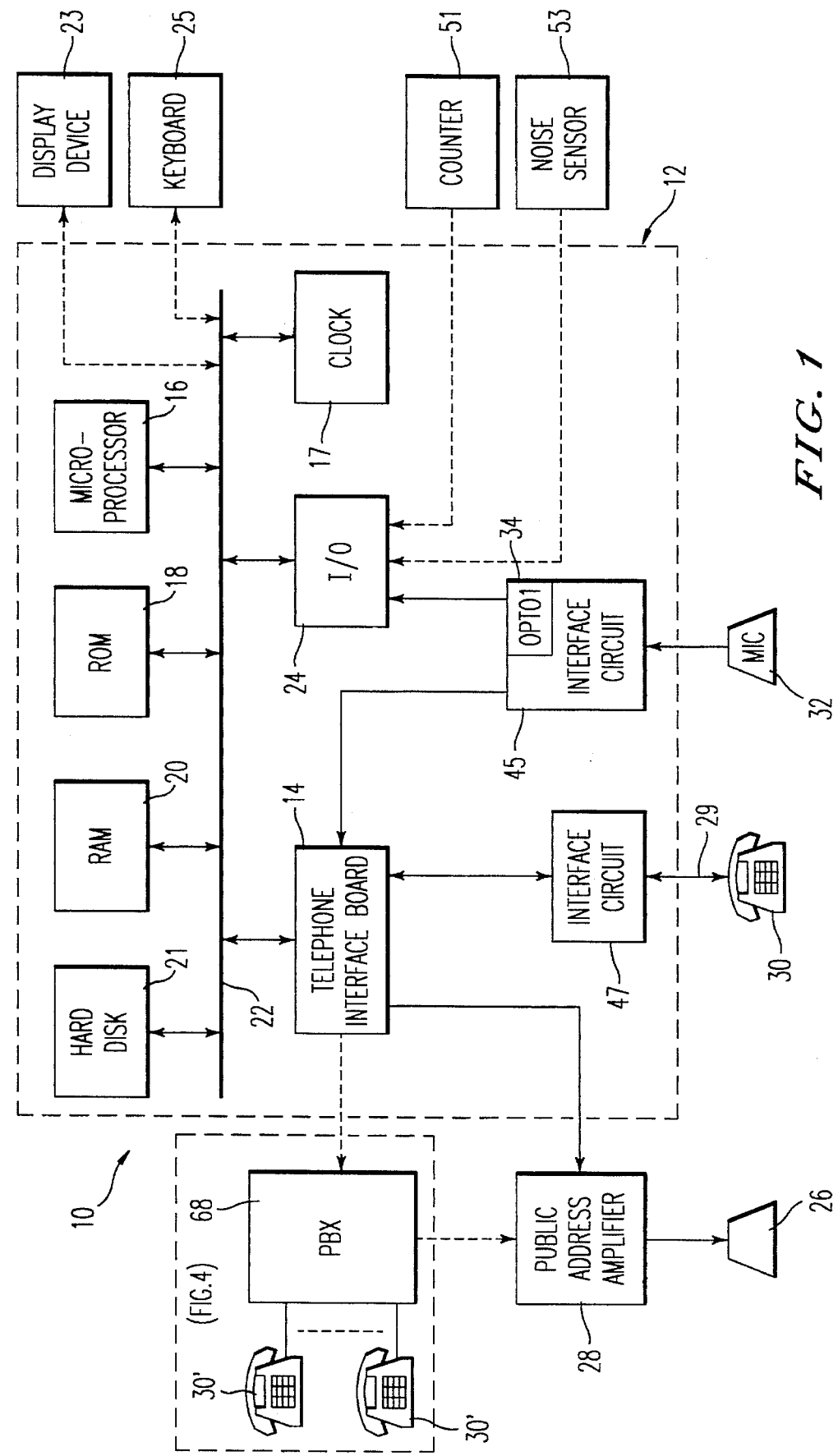
FIG. 1 is a block diagram of a first embodiment of an automated announcement system constructed in accordance with the present invention.

FIG. 1 depicts an automated announcement system 10 constructed in accordance with the present invention. The system 10 preferably comprises a personal computer 12 such as an IBM personal computer Model PC 386, which is provided with a telephone interface card 14 in one of its expansion slots (not shown). The PC 12 comprises a microprocessor 16, a read-only memory (ROM) 18, a random access memory (RAM) 20, and a magnetic hard disk drive 21, all of which operate in conjunction with the telephone interface board 14 using a standard bus 22. The PC also includes a clock 17 and conventional input/output interface components 24 such as serial communication ports. As will be described in further detail below, the microprocessor 16 is programmed to selectively and automatically play recorded audio messages, which have been previously stored on preferably a hard disk 21, over a public address loudspeaker 26 that is driven by a public address amplifier 28. In accordance with one aspect of the invention, the amplifier 28 can be connected to the PC 12 by a conventional telephone line 29 using the telephone interface board 14. In accordance with another embodiment, to be described shortly in connection with FIG. 4, the public address amplifier 28 and one or more conventional telephones can be connected to the PC through a private branch exchange (PBX). Accordingly, the amplifier 28 is connected to the PBX pager output.

With continued reference to FIG. 1, the system 10 is programmable to record and schedule message announcements, to review, to modify or delete previously recorded messages, as well as to perform administrative functions such as personnel authorization using passwords, even while a message is being played. System commands for implementing these functions can be entered using a telephone handset 30 via DTMF signaling or speech input. The system 10 comprises a microphone 32 which interfaces with the PC 12 through a current sensor, e.g., an opto-coupler 34 in an interface circuit 45. The current sensor 34 is used to detect when a push-to-talk (PTT) button on the microphone is depressed. When the button is depressed, the PC inhibits the automated playing of a recorded message through the loudspeaker 24 in order to allow a live, unscheduled announcement to be made using the microphone 32. In accordance with another embodiment, the system 10 is provided with a display device 23 (e.g., a video monitor or LED display screen) and a keyboard 25 connected to the bus 22. The keyboard can be used to enter graphic or alphanumeric messages to be stored and displayed on the display device 23, as well as to perform system functions such as reviewing, modifying or deleting graphic messages or entering data for scheduling message play times. Alternatively, another type of input device can be employed, for example, to store video signals for generation on the display device 23 in accordance with the present invention.

The system hardware of FIG. 1 is based on a standard PC 12 equipped with one or more telephone interface boards 14 for recording and otherwise processing audio messages for scheduled play. The function of a telephone interface board is to provide a telephone line interface to receive analog voice or other audio input signals, digitize the input signals, and store them in the hard disk 21. Another function performed by the telephone interface board 14 is the reverse process of retrieving the digitized audio signals from the hard disk 21, converting them to analog audio signals, and transmitting them for playback over the public address loudspeaker 26. The telephone interface board 14 is preferably a model D21 board manufactured by Dialogic Corporation of Parsippany, N.J., although other telephone interface boards can be used. The D21 board is depicted in detail in FIG. 2.

Figure 2:
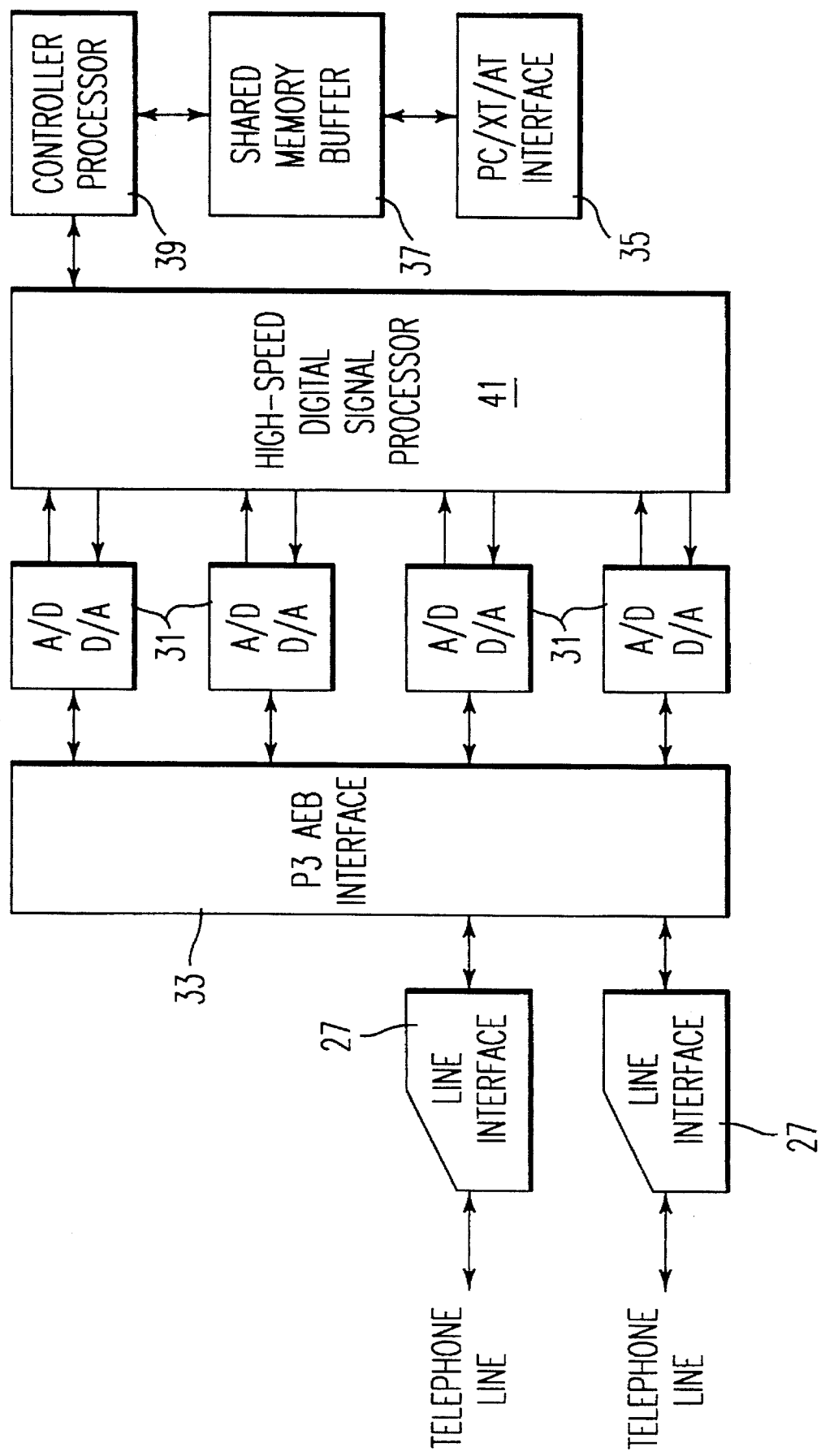
FIG. 2 is a detailed block diagram of a telephone interface board which may be used in the automated announcement system of FIG. 1.

As shown in FIG. 2, the D21 board comprises a telephone line interface 27 and a digital to analog (D/A) and analog to digital (A/D) converter 31 for each of two lines. The interfaces 27 and the converters 31 are coupled to each other through an audio expansion bus (AEB) interface 33. The two lines represent, respectively, two independent voice input/output (I/O) channels. The board 14 communicates with the PC 12 through a PC interface 35 using a shared memory buffer 37, an on-board processor 39 and a digital signal processor 41. The processor 35 operates in accordance with firmware, which is downloaded to the board 14 during initialization, and with a device driver program module written by the board manufacturer to facilitate communication between the board 14 and the PC 12. The D/A and A/D converters 31 operate in accordance with a gain constant. The Dialogic telephone interface board 14 is provided with digital to analog gain control. The PC is programmed to send a volume level parameter to the board which in turn is provided to the D/A converter 31. The gain of the analog output is varied over a range of volume level parameters, for example, between 1 and 10 with a nominal value of 5.

Figure 3A:
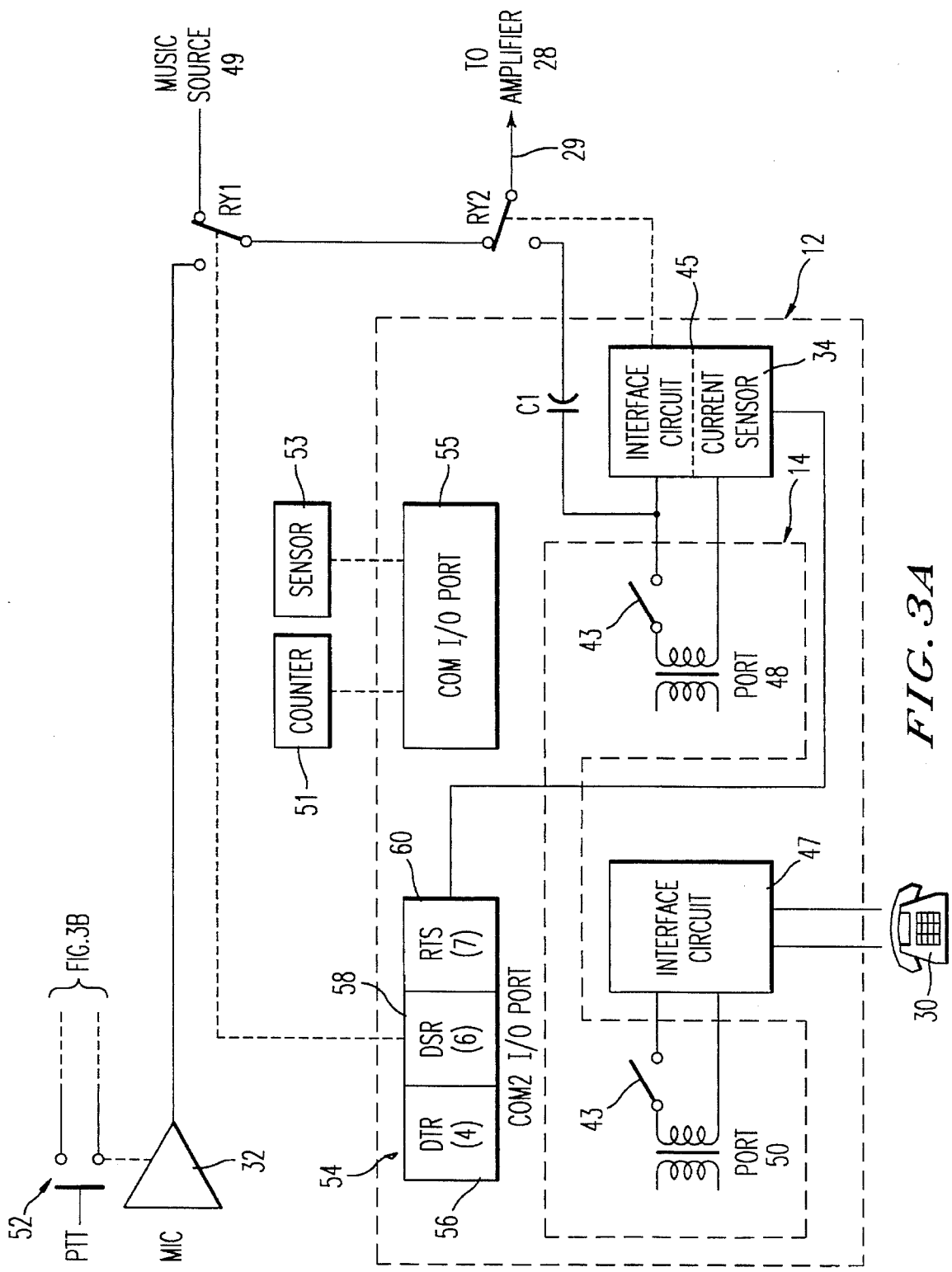
Figure 4:
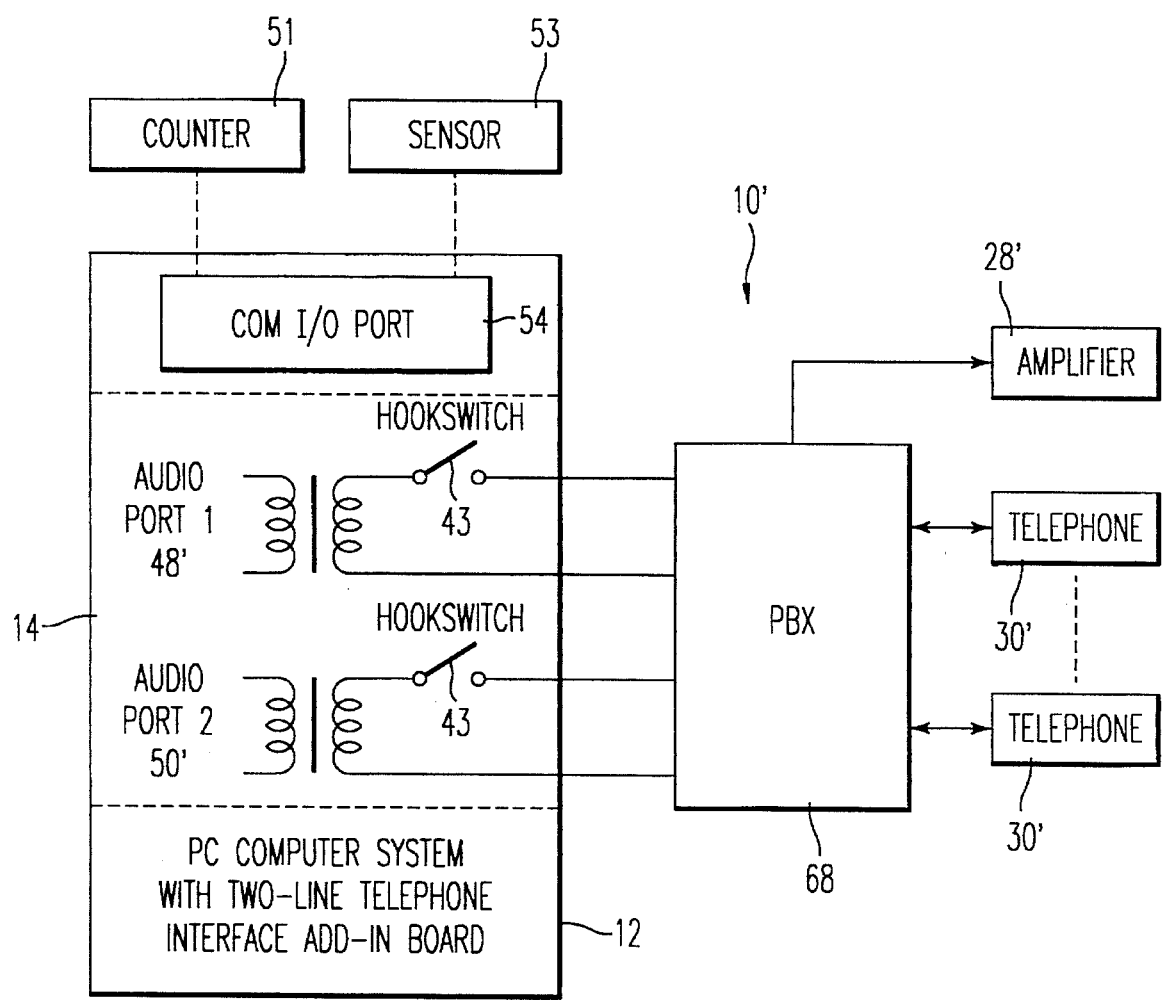
FIG. 4 is a block diagram of a second embodiment of an automated announcement system constructed in accordance with the present invention.

FIGS. 3A through 3C depict in more detail the previously described embodiment of the invention wherein the public address amplifier 28 and the telephone handset 30 are connected directly to the interface board 14 in the PC 12, as opposed to being indirectly connected to the board 14 via a PBX 68 (FIG. 4). As shown in FIG. 3A, the two-port D21 board 14 provides the PC 12 with a first audio port 48 and a second audio port 50. It is to be understood, however, that other multi-port interface boards having two or more audio ports can be used. The board 14 is indicated generally by broken lines in FIGS. 3A through 3C. For clarity, only a hookswitch 43 in the line interface 27 of each line is shown, along with interface circuits 45 and 47, which are described below. The public address amplifier 28 is connected to the PC 12 via port 48. The telephone handset 30 is connected to the PC 12 via port 50. As will be described below in connection with the flow charts of FIGS. 5–16, the system 10 plays recorded messages, which are stored in the hard disk 21, through the amplifier 28 and loudspeaker 26 via port 48. The system 10 permits a caller using the telephone 30 to create, review and modify messages and their playing schedules, among other system functions, via port 50, even while another message is playing through port 48.

With continued reference to FIG. 3A, port 48 is connected to the line 29 that leads to the amplifier 28 by an interface circuit 45 which is depicted in greater detail in FIG. 3B. The interface circuit can be constructed as a separate circuit board that is mounted inside the PC and wired directly to the board 14. Output signals from a current sensing circuit 34, which can comprise an opto-coupler OPTO1 as shown in FIG. 3B, are used by the PC 12 to inhibit the automatic playing of messages over the loudspeaker 26 when a push-to-talk (PTT) button 52 on the microphone 32 is depressed. A serial communication port 54 (e.g., COM2) on the PC 12 receives these output signals, which are designated as DTR, DSR and RTS signals, respectively, to correspond to similarly named pins 56, 58 and 60.

With reference to FIG. 3B, the DTR signal is a positive voltage signal, and the RTS signal is a negative voltage signal. The polarity of the input signal on the DSR pin depends on whether the PTT button is depressed. Thus, the DSR pin or line is a high/low handshake line that is controlled by the current sensing circuit 34. When the PTT button 52 is closed, current flows through pins 1 and 2 of the current sensing circuit 34 and forward-biases the light-emitting diode (LED) 63 in the opto-coupler 34. This allows sufficient base current to flow in the phototransistor 64 of the opto-coupler 34 to cause a collector current to flow from the collector pin 4 to the emitter pin 6. Thus, the DSR signal becomes positive as a result of the DTR pin being at the same positive voltage as the DTR pin when the relay RY1 closes via OPTO1. When the PTT button is not depressed, no current is supplied to pins 1 and 2 of the opto-coupler 34 and hence the phototransistor 64 remains nonconductive. The DSR signal therefore corresponds to the RTS signal, that is, it is negative. The interface circuit 45 also comprises resistors R1 and R2 and a capacitor C1, the values of which are listed in Table 1.

In operation, the PC 12 is programmed to schedule and prioritize the playing of messages, to retrieve messages to be played from the hard disk 21, and to supply the stored audio signals corresponding to the messages to the telephone interface board 14, among other functions. When an audio message is to be played, the telephone interface board 14 closes the hookswitch 43 associated with the port 48, converts the stored signal to an analog audio signal, and provides the audio signal to the amplifier. Meanwhile, the COM port 54 of the PC, which is used to sense the state of the switch on the PTT button, is examined by the PC under program control to determine the state of the DSR signal (i.e., positive or negative). The PC inhibits the automatic playing of messages through port 48 by opening the hookswitch when the PTT button is activated (i.e., when the DSR signal is positive) in order to enable a user to make a live announcement over the loudspeaker 26.

With continued reference to FIGS. 3A and 3B, the interface circuit 45 associated with the port 48 further comprises a second opto-coupler OPTO2 which is energized when the PC commands the hookswitch 43 to go off-hook. When the opto-coupler OPTO2 is energized, the contacts on relay RY2 close. Thus, in a quiescent state, music from a music audio source 49 is connected to the amplifier via the open relay contacts of RY1 and RY2. If it is time for the PC to play a scheduled announcement (i.e., DSR on COM2 is at a negative voltage because the contacts of RY1 are open), the PC commands the port 48 off-hook which energizes OPTO2 and closes the contacts of RY2, thereby removing music from the port 48 and connecting the audio output of port 48 to the amplifier 28.

As stated previously, when the PTT button 52 is activated, audio signals from the microphone 32 are presented to the amplifier of the public address system because relay RY1 closes via OPTO1, thereby disconnecting the music source 49 from the amplifier input 28. As long as the PTT button is activated (i.e., the closed contact of RY1 provides a positive voltage to the DSR terminal on COM2 which is sensed by the PC), port 48 is inhibited by the software described below from closing its hookswitch 43 and therefore from transmitting a recorded announcement. When the PTT button 52 is deactivated, the port 48 may go off-hook and connect its audio output line to the input of the amplifier. The PTT button preferably takes precedence over automated message playing such that pressing the button 52 during a scheduled announcement will cause the PC to stop the announcement. The microprocessor can then replay the message at a later time in accordance with program control described below in connection with FIGS. 5–16, or can store the interrupted announcement in a memory stack in RAM for replay immediately after the live announcement (see block 175 of FIG. 8).

The second port 50 in FIG. 3C is connected through an interface circuit 47 to the telephone handset 30. The interface circuit 47 comprises resistors R3, R4, R5 and R6 and capacitors C2 and C3, the values of which are also listed in Table 1. As indicated in FIGS. 3B and 3C, the interface circuits 45 and 47 are each preferably provided with power from a 12 VDC power supply (not shown). The hookswitch 43 associated with port 50 closes as soon as the system 10 is turned on. The PC monitors the port 50 for a DTMF signal corresponding to the "*" key, which is depressed by the caller using telephone 30 when he wishes to perform a system function such as recording a message. The "*" signal from the telephone in the non-PBX embodiment depicted in FIGS. 3A through 3C shall hereinafter be referred to as the ring signal.

TABLE 1

| Component(s) | Value |
| --- | --- |
| R1 | 470 Ω |
| R2 | 470 Ω |
| R3 | 270 Ω |
| R4 | 270 Ω |
| R5 | 270 Ω |
| R6 | 270 Ω |
| C1 | 4.7 μfarads |
| C2 | 4.7 μfarads |
| C3 | 4.7 μfarads |

When the telephone handset 30 goes off-hook and a ring signal is transmitted to port 50, the hookswitch associated with port 50 is closed by the telephone interface board 14 to establish an audio path between the telephone handset and the port 50. The port 50, therefore, goes off-hook in the same manner as a conventional telephone receiving a call. The PC 12 subsequently provides voice prompts under program control to the user over the audio path. The PC 12 is programmed to process DTMF signals or voice input signals generated by the user and received by the telephone interface board 14. These signals can be control commands to record or modify messages and to specify different play schedule parameters, among other system functions.

With reference to FIG. 3A, the PC can be coupled to a patron counter 51 or to an ambient noise sensor 53 via another COM port 55 for automatically adjusting the volume of announcements played on the public address system, in accordance with another aspect of the present invention. For example, the volume at which announcements are played is automatically increased or decreased by the PC under program control in response to the number of occupants in a region serviced by the public address system, as detected by the counter 51, or by the ambient noise level in the region, as detected by the sensor 53. The volume adjustment can be made in accordance with the day of week and/or time of day, as detected by the clock 17. These methods for environment-response announcement volume control are described in more detail in connection with FIG. 8.

The modified system 10', depicted in FIG. 4, employs a PBX 68 to couple the amplifier 28', and one or more telephone(s) 30' to the ports 48 and 50. For illustrative purposes, the board 14 is indicated by broken lines in the PC 12. The system 10' operates similarly to the system 10 depicted in FIG. 3 by determining when a message should be played, and providing the message from the hard disk 21 to the audio port 48 of the telephone interface board 14. When a message is to be played or a live announcement is to be made using a microphone, e.g., a telephone connected to the PBX 68, the telephone interface board 14 closes the hookswitch 43 associated with the port 48 and dials the paging extension of the PBX 68, which is connected to the amplifier 28'. An audio path is established between the amplifier 28' and port 48 of the PC via the PBX 68. The PBX returns a busy signal if the paging extension is busy. The PC hangs up port 48 and dials the pager code again at a later time when the pager is not busy. Unlike the non-PBX embodiment depicted in FIGS. 3A through 3C, the system 10' does not require the PTT button 52 because the PC will detect a busy signal generated by the PBX when the PC attempts to play a message over the port 48 while the microphone is in use.

A PBX 68 can also be used to establish an audio path between the telephone(s) 30' and the port 50 of the PC. Since the telephones and the ports each correspond to an extension number on the PBX, a system administrator can use a telephone 30' to implement various system functions by dialing a telephone number corresponding to the port 50 on the PC. Thus, the PC waits to receive ringing signals generated by the PBX for the dialed extension of the port 50 on the PC, as opposed to the DTMF tones signifying that an "*" key was depressed by a system administrator in the system 10 (FIGS. 3A through 3C).

The PBX 68 in the system 10' allows for additional ports to be used, if they are available on the telephone interface board, to accommodate more than one public address amplifier 28' or telephone 30'. For example, more than one system administrator can access the system 10' on different telephones 30', each of which is coupled to a different port on a telephone interface board. In addition, a building (i.e., shopping mall) can have several different regions, each of which is served by a corresponding public address amplifier for playing announcements uniquely applicable to that region. Finally, ports 48 and 50 can both be coupled to a PBX, or neither of them coupled to the PBX (see FIGS. 3A through 3C), or one port can be connected to a PBX while the other port is provided with a PTT button 52 and an interface circuit 45. If the telephones 30 are connected to port 50 via a central office (CO) or a PBX, then the circuit comprising R3, R4, R5, R6, C2 and C3 (FIG. 3C) is not necessary.

Programmed control of the automated announcement system 10 of the present invention will be described with reference to the flow charts of FIGS. 5 through 16. The system generally utilizes two databases, that is, one for each of the ports 48 and 50. The databases for ports 48 and 50 shall hereinafter be referred to as database 001 and database 002, respectively. The field structures in each database are listed in Tables 2 and 3. A separate record comprising the fields set forth in Table 2 below is created in database 001 for each message stored in the hard disk 21, whereas database 002 consists of a single record which relates to all stored messages and comprises the fields set forth in Table 3 below. Use of the data in the database fields by the system of the present invention is discussed in more detail below in the description of the flow charts.

TABLE 2

DATABASE 001 RECORD STRUCTURE

| | |
|---|---|
| Field 1: | Record number (1, 2 . . . N). |
| Field 2: | Announcement number (101, 102 . . . ). |
| Field 3: | Scheduled daily start time for this announcement (in minutes). |
| Field 4: | Scheduled daily stop time for this announcement (in minutes). |
| Field 5: | Scheduled days of week for this announcement (up to 7 digits, 1 = Sunday, 2 = Monday . . . 7 = Saturday). |
| Field 6: | Announcement play interval (in minutes). |
| Field 7: | Number of times announcement has played today. |
| Field 8: | Next play time for this announcement (in minutes). |
| Field 9: | Last time this announcement was played (in minutes). |
| Field 10: | 00 = regular announcement<br>01 = perpetual announcement<br>10 = priority announcement<br>11 = perpetual & priority announcement |

TABLE 3

DATABASE 002 STRUCTURE

| | |
|---|---|
| Field 1: | 1 |
| Field 2: | System password (default = 1#). |
| Field 3: | Management password (default = 2#). |
| Field 4: | Minimum elapsed time in minutes between any two announcements (Default = 6). |
| Field 5: | Date of last system reset (MMDD). |
| Field 6: | Maximum number of announcements allowed in the system (Default = 100). |
| Field 7: | Day of week to delete all non perpetual announcements (Default = Wed). |
| Field 8: | Announcement volume level 10–90 (Default = 50). |
| Field 9: | Announcement number selected to play next. |
| Field 10: | Maximum length (seconds) allowed for any announcement. |

Figure 5:
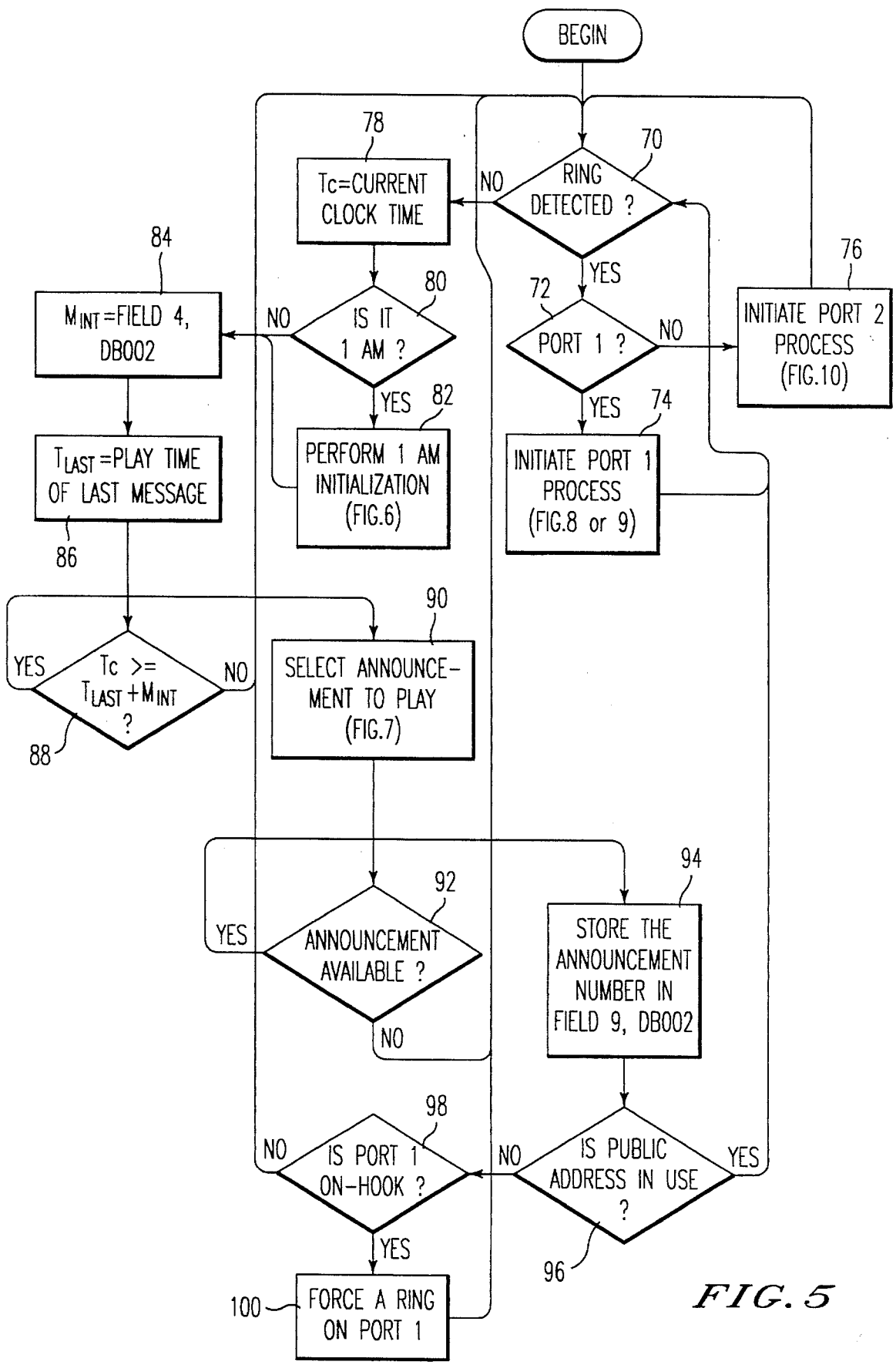
FIGS. 5–16B are flow charts illustrating the computer processing steps that are used to operate the automated announcement system of the present invention.

The overall flow of processing events for interfacing the PC 12 and public address system 28 in accordance with the present invention is presented in FIG. 5. The microprocessor 16 of the PC 12 is programmed to receive status signals from the telephone interface board 14 that correspond to each port. The status signals indicate, for example, if the telephone line associated with each port has a dial tone, a ringing signal or a busy signal thereon. Data relating to the status of each port is stored in a buffer created in the RAM 20 for each port. The buffers for ports 48 and 50 are continuously updated. As shown in block 70 of FIG. 5, the microprocessor 16 is programmed to determine if the port 48 has been taken off-hook, as will be described in connection with block 100. If the port 48 has a ringing signal (e.g., has been taken off-hook), the microprocessor 16 operates port 48 in accordance with events described in connection with FIGS. 8 or 9; otherwise, the PC 12 operates port 50 in accordance with FIG. 10, as indicated by blocks 72, 74 and 76. Since the microprocessor is capable of multi-tasking, port 50 can be initialized while the microprocessor is detecting when port 48 goes off-hook. Blocks 70, 72, 74 and 78 illustrate one method by which the PC can monitor ports 48 and 50. This method is generally useful when the system is configured with a PBX 68 (see FIG. 4). The detection of a ring (block 70) is essentially detection by the microprocessor of an off-hook condition on port 48 or port 50, which are both connected to the PBX. Alternatively, in a non-PBX embodiment (FIGS. 3A through 3C), the microprocessor 16 can take port 50 off-hook via commands to the telephone interface board 14. If a ring is detected on port 50 (e.g., a DTMF tone corresponding to the "*" key), the microprocessor can initiate the process in FIG. 10. If no "*" is detected, the microprocessor can determine if port 48 is off-hook.

With continued reference to FIG. 5, the internal clock 17 of the microprocessor 16 provides the current time of day. The microprocessor is programmed to convert the clock time into minutes of the day and store this quantity in RAM 20 as the variable Tc. As indicated by the negative branch of decision block 70 and block 78, the microprocessor determines if the variable Tc or current time is 1:00 am. As shown by the affirmative branch of block 80 and block 82, the microprocessor executes a 1:00 am initialization subroutine, which is described below with reference to FIG. 6.

In addition to Tc, another variable used in computations by the microprocessor is referred to as Mint (minimum interval) and is stored in field 4 of database 002, as indicated in block 84. Mint represents the minimum time in minutes which must elapse between the playing of two messages. The system 10 defers automated playing of a message until the number of minutes equivalent to the value of Mint has elapsed since the playing of the previous message ended. Mint is usually specified by the system administrator using the telephone 30 (see block 294 of FIG. 11). As shown in block 86, the microprocessor sets a variable Tlast (last play time) equivalent to a field from a record corresponding to the message that was most recently played (i.e., field 9 of database 001). The variable Tlast is stored in RAM for processing purposes, while the field 009 of the record is updated and stored on the hard disk. As shown in block 88, the microprocessor determines if another message can be played over the loudspeaker 26 of the public address system using the variable Tc. If Tc is greater than or equal to the time the last message was played (Tlast) added to the minimum required time interval between messages (Mint), then another message can be selected for playing in accordance with FIG. 7, as indicated by block 90. If the test in decision block 88 fails, however, the microprocessor proceeds to determine if ringing has occurred on the port 48, as indicated by the negative branch of block 88.

As shown in blocks 92 and 94 of FIG. 5, if a message is selected for playing as an announcement over the loudspeaker 26, a number identifying the selected message is stored in field 9 of database 002; otherwise, the microprocessor continues searching for ringing on the port 48 (i.e., for an off-hook condition). Before attempting to play the selected message, the microprocessor 16 determines if the public address system is presently in use by reading COM port 2 (i.e., determining if the PTT button on the microphone is activated) or by determining if the PBX has generated a busy signal, as shown in block 96. If the public address system is in use or the port 48 is off-hook, then the microprocessor will not play the selected message and will instead proceed to detect when port 48 goes from an on-hook to an off-hook condition again, as indicated by the positive and negative branches of decision blocks 96 and 98, respectively. If the port 48 is on-hook, the microprocessor operates in conjunction with the telephone interface board 14 to force port 48 off-hook, as shown in block 100. The forced off-hook condition will then be detected by the microprocessor which, in turn, operates the port 48 in accordance with FIG. 8 or 9.

If the system of the present invention is configured with the capability of displaying visual messages while a corresponding audio message is broadcast, then the process is, for the most part, the same as the process for playing audio messages, as described in connection with FIG. 5. As will be discussed with FIGS. 8 and 9, the microprocessor accesses additional fields in the record of each audio message to obtain the announcement number for the corresponding visual message.

The process illustrated in FIG. 5 can be modified in order to display visual messages independently of the playing of audio messages. The microprocessor can be programmed to initially perform the processes described in connection with blocks 78, 80, 82, 84, 86, 88, 90 and 92. The database 001 can be provided with additional fields in each record for designating whether the corresponding message is a visual or an audio type message, and for specifying the number, if any, of an announcement to be played simultaneously with the selected announcement. The microprocessor in turn accesses the record fields of the selected announcement, and proceeds to provide the message data to the display device 23 via the bus if it is a display-only-type message. If the message requires the simultaneous play of an audio message or is itself an audio-type message, the microprocessor proceeds to determine the status of ports 48 and 50, as described in connection with blocks 70, 72, 74 and 76. The PC can be programmed to establish a priority on visual messages based on play deficit, as well as perform different system functions, in much the same way as described below for audio messages.

Figure 6:
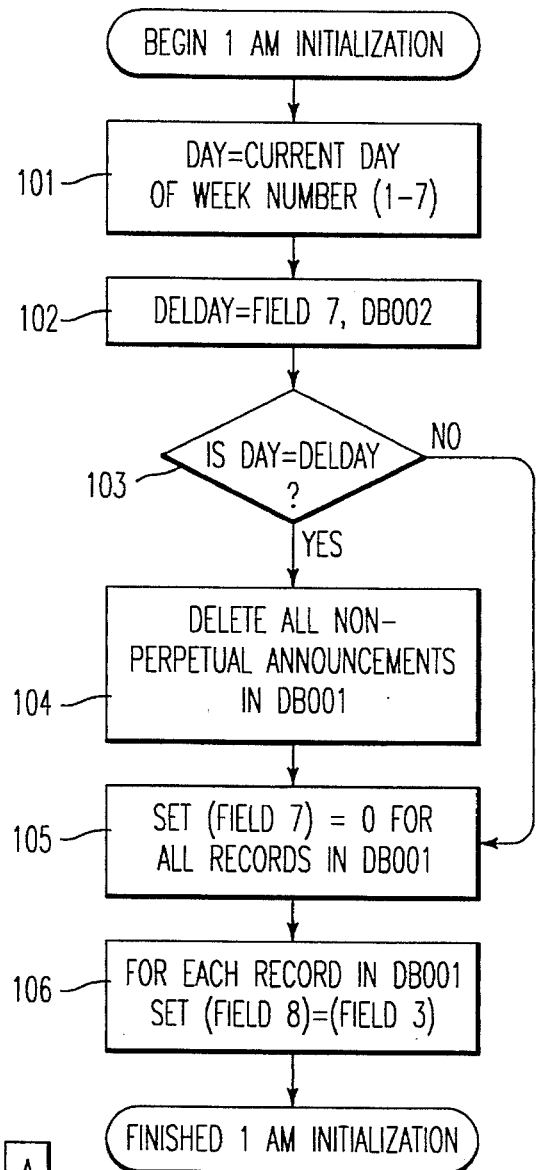

One o'clock am initialization is described with reference to FIG. 6. Certain system variables are reset at the beginning of each day. The actual time for resetting variables is arbitrary, but the 1:00 am time is selected for practical reasons (e.g., the system administrator may not foresee much use of the public address system at this time). As shown in block 101, the microprocessor 16 sets a variable DAY to the day indicated by the internal PC clock. The microprocessor compares the variable DAY with field 7 of database 002, as indicated in blocks 102 and 103. If these numerical values are equal, then the microprocessor deletes messages designated for non-perpetual playing, as shown in block 104. Active message (announcement) numbers are preferably within the range 101–199. Thus, messages can be designated as deleted from the active list of messages in the database 001 by adding the value 1000 to the message numbers. The microprocessor subsequently sets the number of times a message has been played (field 7 in database 001) to zero in each record, as shown in block 105. Finally, the microprocessor resets the value in field 3 of each record to the value in the corresponding field 8, as shown in block 106. Thus, the next play time for the announcement (field 8) is initially the same as the scheduled start time (field 3).

Figure 7B:
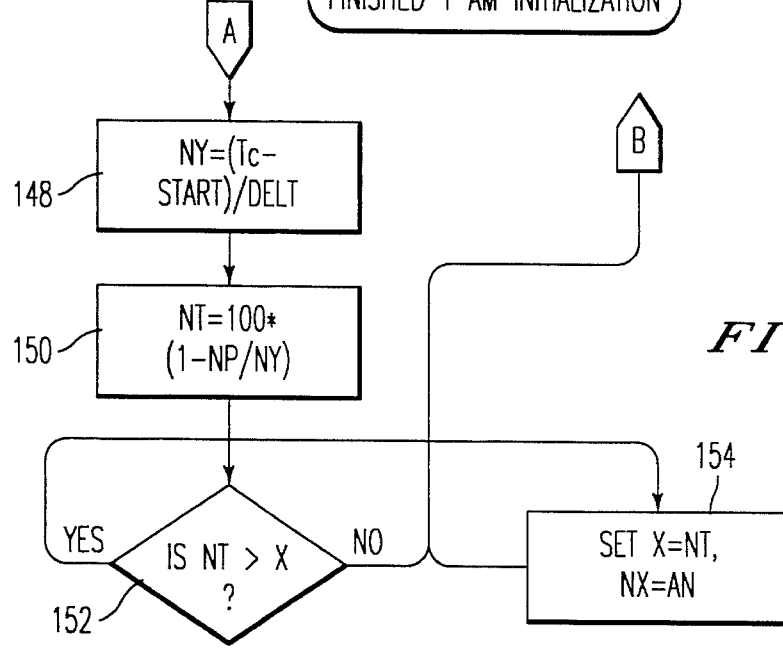
Figure 7A:
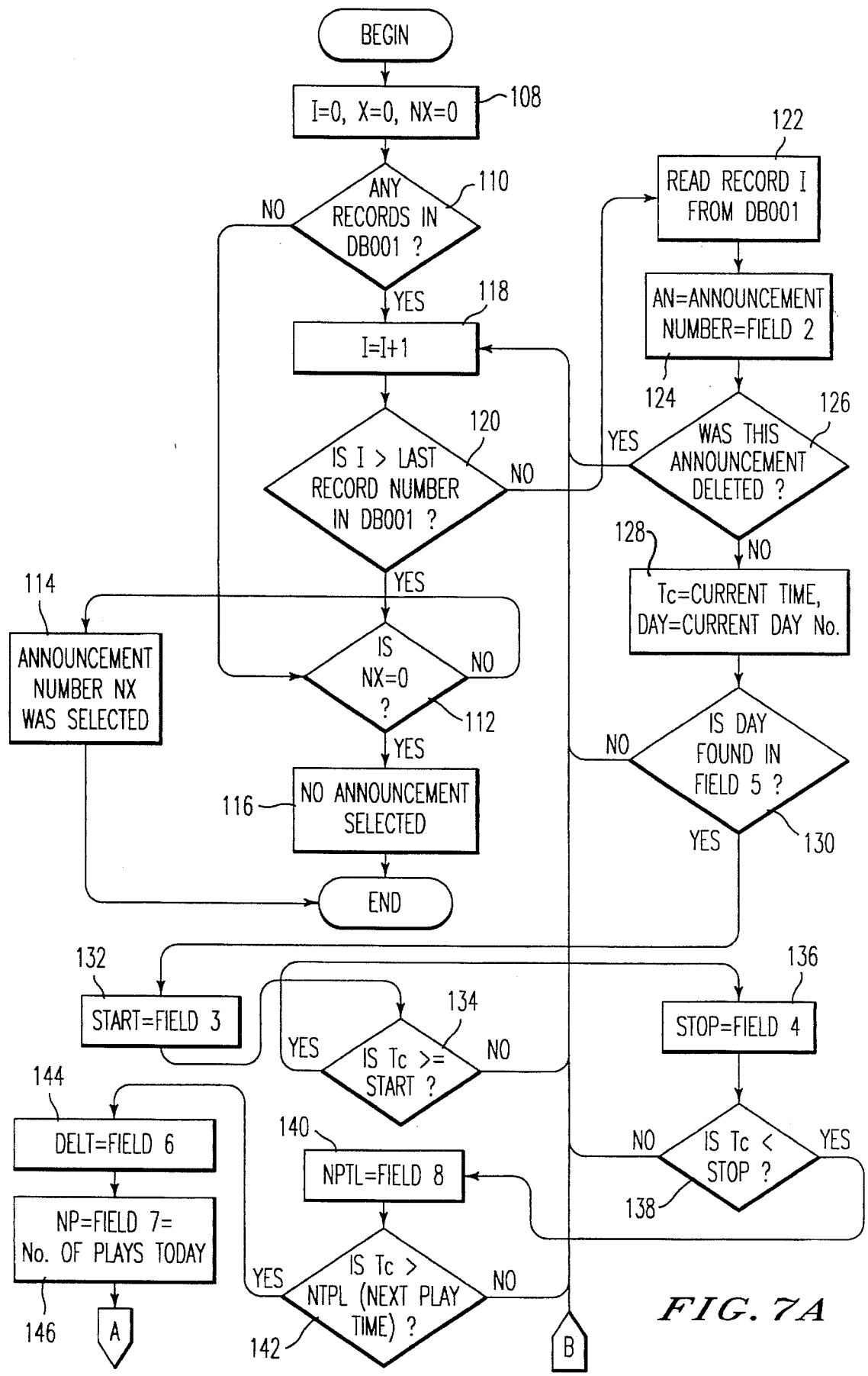

FIG. 7 illustrates the sequence of processing steps by which the microprocessor 16 selects a message for play as an announcement over the public address loudspeaker 26. The announcement selection method is designed to make a selection based on a greatest play deficit criterion in accordance with the present invention. Since it is possible that more than one announcement at a given time will meet the specified start and stop times and play frequency criteria specified in database 001, either as a result of an overlap in original scheduling or as a result of announcements that have been deferred as a result of the selected Mint value, the selection method is designed to measure a play deficit for each message stored on hard disk, and to select that message which exhibits the greatest play deficit. This process ensures that selection probabilities for messages are substantially equalized over time.

With reference to block 108 of FIG. 7, the selection algorithm begins with the microprocessor initializing local variables I, X, AN and NX to the numerical value 0. As shown in block 110, the microprocessor examines database 001 to determine if it contains any records. If the database is empty, the microprocessor determines whether the variable NX is 0, shown in block 112. As shown in block 114, if NX equals a number other than 0, then an announcement has been selected as will be described in connection with block 154. If NX is equal to 0, then no announcement was selected, as shown in block 116.

As indicated by the affirmative branch of decision block 110 and block 118, the microprocessor increments the variable I if records exist in database 001. As shown in block 120, the microprocessor determines if the record having a record number (field 1) equivalent to the variable I exists in the database 001 by determining if the numerical value of the variable I is greater than the record number of the last record in the database. If record I exists in the database, the data in the fields 1 through 10 of the record are read into a memory buffer in RAM for further processing, as shown in block 122. As indicated by the affirmative branch of decision block 120, if record I does not exist in the database 001, then the procedure illustrated in FIG. 7 is complete, i.e., either an announcement was selected (block 114) or no announcement was selected (block 116).

After a record is read from the database 001, the microprocessor sets the variable AN to the value of field 2 of the retrieved record which corresponds to the record's announcement number, as shown in block 124. As indicated in block 126, the microprocessor determines if the message corresponding to the retrieved record is a deleted announcement. Active announcement numbers are preferably in the range of 101 to 199. Deleted announcements can be therefore distinguished from active announcements by their announcement numbers, which have had the numerical value 1000 added to them. Thus, if AN is greater than 1000, then the announcement or message has been deleted from the active list of messages. As indicated by the affirmative branch of decision block 126, the variable I is incremented again, and the microprocessor continues to search for another record in the database 001.

If the record I is active, the microprocessor 16 sets local variables Tc and DAY using the internal clock, as shown in block 128. As indicated in decision block 130, the microprocessor compares the data in field 5 of the record I with the variable DAY. As indicated by the negative branch of decision block 130, the microprocessor proceeds to search for another record in the database if the current record is not scheduled to be played on the current day. If the record I is scheduled to be played on the current day, the microprocessor proceeds to compare the variable Tc with the scheduled start time, i.e., field 3 of the record I, as shown in block 132. As indicated by blocks 134, 136 and 138, the microprocessor determines whether the current time Tc is greater than the scheduled start time (field 3) and less than the scheduled stop time (field 4). If the tests in decisions blocks 134 and 138 are both affirmative, the variable NPTL, is set to the numerical value stored in field 8 of record I, as indicated in block 140. If the tests in Decision blocks 134 and 138 fail, the microprocessor proceeds to search for another record in database 001.

As indicated by the affirmative branch of decision block 142 in FIG. 7, the microprocessor determines if the current time Tc is greater than the variable NPTL which represents the next play time for the message. If the variable Tc is greater than NPTL, then the message corresponding to record I having announcement number AN is a potential selection candidate. If Tc is less than NPTL, then the microprocessor continues to search for another record in the database. With reference to blocks 144, 146, 148 and 150, the microprocessor proceeds to determine for the potential selection candidate corresponding to record I the numerical quantities DELT, NP, NY and NT, respectively. DELT (field 6) represents the announcement play interval in minutes. NP (field 7) represents the number of times that the message corresponding to record I has been played on the current DAY. NY is equivalent to $$1 + \frac{(Tc - START)}{DELT}$$

where Tc, START (i.e., field 3 of corresponding record in database 001) and DELT are in minutes. NT is equal to $$100 * \left(1 - \frac{NP}{NY}\right).$$

Figure 9:
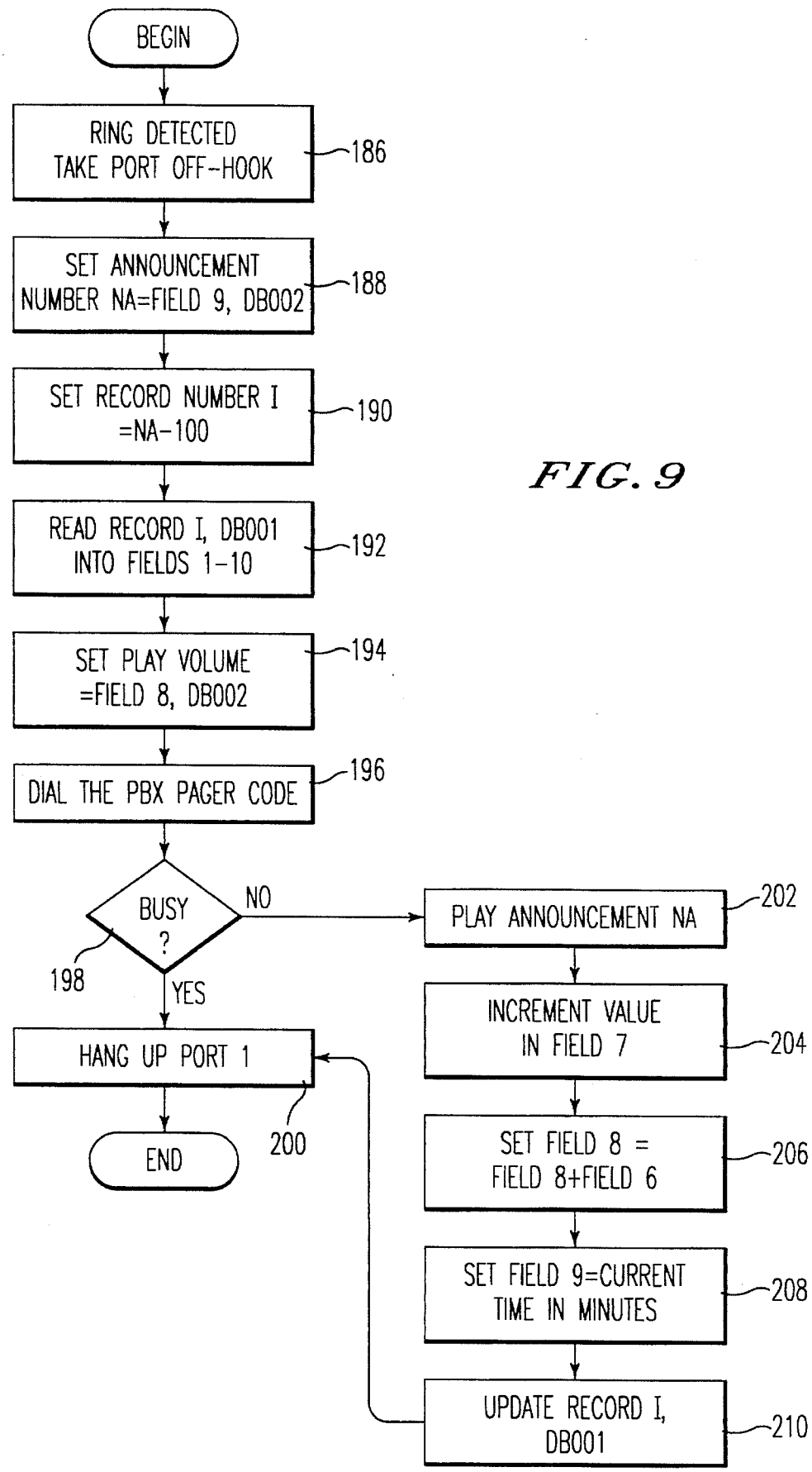

The computed quantity NY represents the number of times that the message having announcement number AN would have been played if it were the only message in the database. The ratio NP/NY is the ratio between the actual and the ideal number of play times for the announcement AN. The quantity NT represents the play deficit. For example, if NP is equal to NY, then NT is equivalent to zero and there is no play deficit. On the other hand, if NP equals zero, then the play deficit is equal to 100, the maximum possible value. As shown in decision block 152, the microprocessor compares NT with the variable X. If NT is greater than X, then the microprocessor sets the variable X to the value NT, and sets the variable NX to the value NA, as shown in block 154. The microprocessor then proceeds to block 118 to search for another record in the database. The variable NA, which will be described in connection with FIG. 9, is the announcement selected to be played. After all of the records in database 001 have been processed in accordance with FIG. 7, the variable NX will represent the selected announcement number, which is the one with the greatest play deficit.

In an alternative embodiment of the present invention, the greatest play deficit can be determined on a basis other than the number of times a message should have been played on a particular day. For example, play deficit can be determined based on the last hour of play or any time period less than 24 hours. This embodiment is useful when messages are only played during certain hours during the day. Field 9 of database 001 can be provided with a number of subfields containing, respectively, the times (TLAST1 through TLASTn) that the message was played during the previous hour. Thus, NY represents $$1 + \frac{60}{DELT}$$

and NT is essentially the same as previously described, except that NP represents the number of times the message was played during the last hour as derived from the subfields of field 9.

Figure 8:
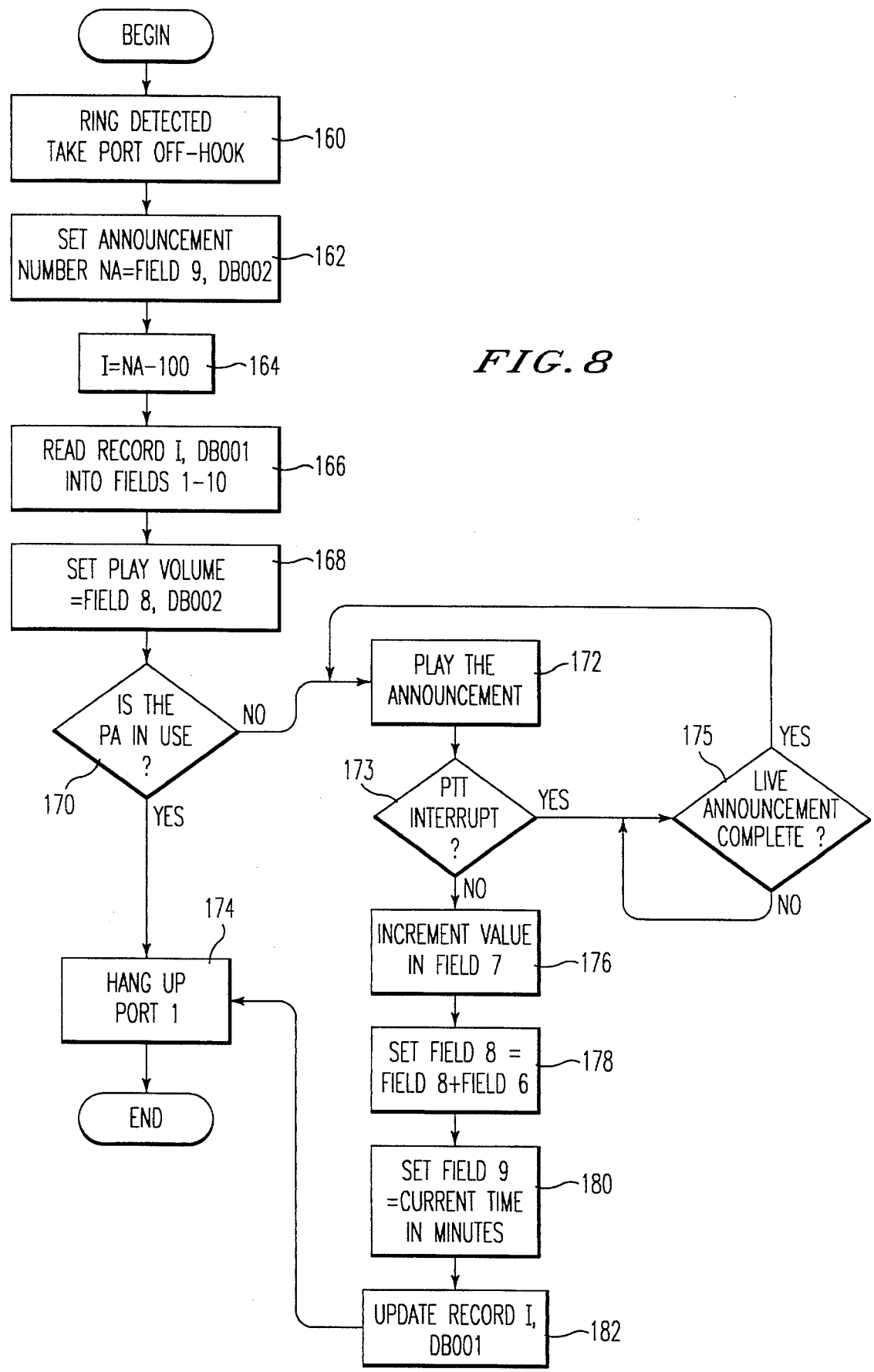

After an announcement has been selected for play over the public address loudspeaker in accordance with FIG. 7, the microprocessor in conjunction with the telephone interface board 14 operates port 48 in accordance with the processing events illustrated in FIG. 8 in order to provide the selected message to the public address amplifier 28 and/or to the display device 23. As shown in block 160 of FIG. 8, the microprocessor 16 detects the ring which was generated in accordance with block 100 in FIG. 5, that is, determines if port 48 is off-hook. After the microprocessor takes port 48 off-hook, the announcement number NA is set to the value stored in field 9 of database 002, as indicated in block 162. The microprocessor proceeds to locate the record number I which corresponds to the announcement NA, as shown in block 164. The numerical value 100 is subtracted from the announcement number NA because record numbers and their associated announcement numbers differ by this value as indicated in fields 1 and 2 in Table 2. After the microprocessor has located the record corresponding to announcement number NA, the record is preferably read from the hard disk 21 into a memory buffer in RAM 20 for further processing, as shown in block 166.

In accordance with one aspect of the present invention, the volume level for announcements can be adjusted each time an announcement is provided to the amplifier 28. This is advantageous because announcements over a public address system may require being played at louder volumes at various times during the day. For example, announcements in a shopping mall generally need to be played loudly during a week day lunch hour or Saturday afternoon in order to overcome noise commonly found in a crowded shopping mall at these times. Further, some announcements such as emergency announcements may need to be played more loudly than other types of announcements. As shown in block 168, the volume is set to play in accordance with the volume level indicated in field 8 of database 002. The volume in the database 002 is specified by the system administrator during system initialization (FIG. 6). In one embodiment of the invention, the system 10 can prompt the administrator to enter different values (e.g., between 1 and 10) for different days of the week and day times. For example, the administrator may wish to play announcements more loudly during Saturday afternoons and weekday lunchtime when there are more patrons in the area served by the public address system. Thus, field 8 can comprise a number of subfields for storing these different values. Accordingly, the microprocessor 16 dynamically adjusts the volume in accordance with the data in field 8 by sending the appropriate volume parameter to the board 14 (as described previously in connection with FIG. 2). In other embodiments, field 8 of database 002 is automatically updated by the output of a counter which determines the number of people entering and leaving a store, for example, or an ambient noise sensor, which measures background noise in the store. The noise sensor can consist of one or more microphones that are connected to an audio amplifier, the amplified audio output signals of which is averaged and then digitized to yield a measure of ambient store noise. The output signals from the counter or noise sensor can be provided to the PC via a COM port 55. The microprocessor in turn uses the output signals to determine appropriate volume parameters for continuously updating field 8 of database 002.

As shown in decision blocks 170 and 172 of FIG. 8, the announcement is played over the public address system if it is not currently in use, i.e., the PTT button on the microphone has not been depressed or on the display device 23. If the administrator wishes to display a graphic message on the display device while a corresponding audio message is broadcast via the public address loudspeaker, the administrator can enter data into, for example, an additional field provided in each record of database 001 (i.e., field 11). The field can be used to specify the announcement number of a corresponding graphic message for simultaneous display. The microprocessor in turn plays only an audio message on the loudspeaker, or an audio message on the loudspeaker while the corresponding graphic message is displayed on the display device 23, depending on the data provided by the system administrator in the additional field 11.

As shown in block 174, the microprocessor instructs the telephone interface board to hang up port 48 if the public address system is already in use and an announcement is scheduled to be played or displayed. Since the non-PBX embodiment of the system 10 (FIG. 3) can be operated in conjunction with a microphone 32 and a PTT button 52, the microprocessor monitors the COM port to determine if the button had been depressed, as shown in block 173. If the selected announcement is interrupted by a live announcement, the interrupted announcement is stored in a memory stack in RAM and then played at the conclusion of the live announcement as indicated by block 175. After the announcement is played, the microprocessor increments field 7 in database 001 in order to increase by one the number representing the number of times the announcement has been played during the current day by the value 1, as indicated in block 176. As shown in blocks 178 and 180, fields 8 and 9 of record I are also updated. Field 8 is incremented by the microprocessor by the value stored in field 6. Field 8 represents the time to play the announcement again. The announcement corresponding to record I will not be played again unless the current time Tc is greater than the value stored in this field. It is to be understood that updating the next play time (field 8) for other announcements is not necessary at this time. Field 9 is incremented by the current time which is obtained from the clock and converted to minutes. After record I has been updated, it is stored once again onto the hard disk, as shown in block 182. If a graphic and a corresponding audio message are displayed and broadcast, respectively, both records are updated as described.

FIG. 9 illustrates the processing events by which the microprocessor plays an announcement over port 48 to the public address amplifier through a PBX (FIG. 4). Blocks 186, 188, 190, 192 and 194 are identical to blocks 160, 162, 164, 166 and 168 of FIG. 8, respectively. As shown in block 196 of FIG. 9, the microprocessor is programmed to dial the pager code of the PBX, that is, the telephone interface board is instructed to put DTMF signals corresponding to the PBX pager code on the audio path between the PC and the PBX. As shown in blocks 198 and 200, the microprocessor instructs the telephone interface board to hang up the port 48 in the event that the microprocessor receives a busy signal from the PBX via the telephone interface board. If the PBX is not busy, the microprocessor plays the message corresponding the announcement number NA, as shown in block 202. As stated previously in connection with block 172 of FIG. 8, the selected announcement can be played in conjunction with a graphic announcement or by itself. The record corresponding to each played announcement is subsequently updated in blocks 204, 206, 208 and 210, which are identical to blocks 176, 178, 180 and 182 of FIG. 8, respectively.

The process for using a telephone 30 and port 50 in order to record, review, modify or delete messages, as well as perform other system functions, is described in connection with FIG. 10. As shown in block 216, the microprocessor determines whether or not the system 10 has been initialized, as shown in decision block 216. As shown in block 218, the system can be initialized in accordance with the procedure depicted in FIG. 11. If the system has already been initialized, the microprocessor plays a prerecorded greeting with a prompt for the caller to enter a system password via port 50, as shown in block 220. The caller can enter the password using a keypad (i.e., DTMF signal generation) or voice input if the PC has a voice recognition capability. As shown in blocks 222 and 224, the microprocessor obtains the password from the caller via the telephone interface board and compares the entered data with field 2 in database 002. If the entered value and the stored value are not identical, the microprocessor plays an error message to the caller, as shown in block 226, and repeats the greeting and prompt described in connection with block 220.

If a correct password is entered, the microprocessor plays a prerecorded message describing a main selection menu, as shown in block 228. The prerecorded message prompts the caller to enter a single digit on the telephone keypad, as shown in block 230 to specify a menu selection. Selection 1 (blocks 232 and 234) permits the caller to record a new announcement, as will be described in connection with FIG. 12. Selection 2 (blocks 236 and 238) permits the caller to review an announcement, as will be described in connection with FIG. 13. Selection 3 (blocks 240 and 242) permits the caller to delete an announcement in accordance with the process described in FIG. 14. Selection 4 (blocks 244 and 246) provides the caller with a number of management options which are described in connection with FIG. 15. Selection 5 (block 248) and selection 6 (block 252) permit the caller to change an announcement schedule and play frequency, respectively. With reference to blocks 250 and 254, the microprocessor plays messages and prompts to the caller in order to change various fields (e.g., fields 3, 4, 5, 6 and 10) in a record stored in database 001 which corresponds to a selected message, the number of which is entered by the caller using the telephone keypad. As shown in blocks 256, 258 and 260, if the user enters numeral 7, 8, 9 or 0, the microprocessor plays a good-bye message and subsequently instructs the telephone interface board 14 to hang up port 50.

System initialization wherein the caller enters desired values into the fields of database 002 is generally performed the first time that port 50 is accessed. As shown in blocks 266 and 272 of FIG. 11, the microprocessor plays a prerecorded message via port 50 on the telephone interface board which prompts the caller to enter a time and date using the keypad. As shown in blocks 268 and 274, the microprocessor 16 receives the data entered by the caller and determines whether the data represents a valid date and time, as shown in blocks 270 and 276, respectively. If an invalid date or time is entered (e.g., MM= 13 or HH= 27), the microprocessor prompts the caller for another date or time. If the date and time entered by the caller is valid, the microprocessor resets the internal PC clock to these values, as shown by the affirmative branch of block 280 and block 282. Similarly, the microprocessor prompts the caller to enter system and management passwords, as shown in block 284. After the passwords are confirmed with the caller, as shown in blocks 286 and 288, the microprocessor stores the passwords into fields 2 and 3, respectively, of database 002, as shown in blocks 290 and 292.

The microprocessor also prompts the caller to enter a value representing the minimum number of minutes which should elapse between any two announcements, as shown in block 294. With reference to blocks 296, 298 and 300, the microprocessor confirms the value with the caller and then stores it in field 4 of database 002. With reference to blocks 302, 304, 306 and 308, the microprocessor prompts the caller to enter a value representing the maximum number of announcements which can be stored in database 001 (default= 100), confirms the number entered by the caller, and stores the value in field 6 of database 002. The microprocessor similarly obtains from the caller the day of the week on which all nonperpetual announcements should be deleted (i.e., default= Wednesday), and stores it in field 7 of database 002 after confirming the entry with the caller, as shown in blocks 310, 312, 314 and 316. The caller is subsequently prompted to enter an announcement volume level, e.g., a level between 10 and 90 with a default value of 50, which is stored in field 8 of database 002 after the microprocessor confirms the entered value with the caller, as indicated in blocks 318, 320, 322 and 324. With reference to blocks 236, 328, 330 and 332, the microprocessor prompts the caller to enter a value representing the maximum allowable length or duration of an announcement in seconds, confirms the value entered by the callers and then stores the value in field 10 of database 002. Finally, the microprocessor stores the current date in field 5 of the database 002, as shown in block 334. This date represents the date of the last system reset.

Figure 12A:
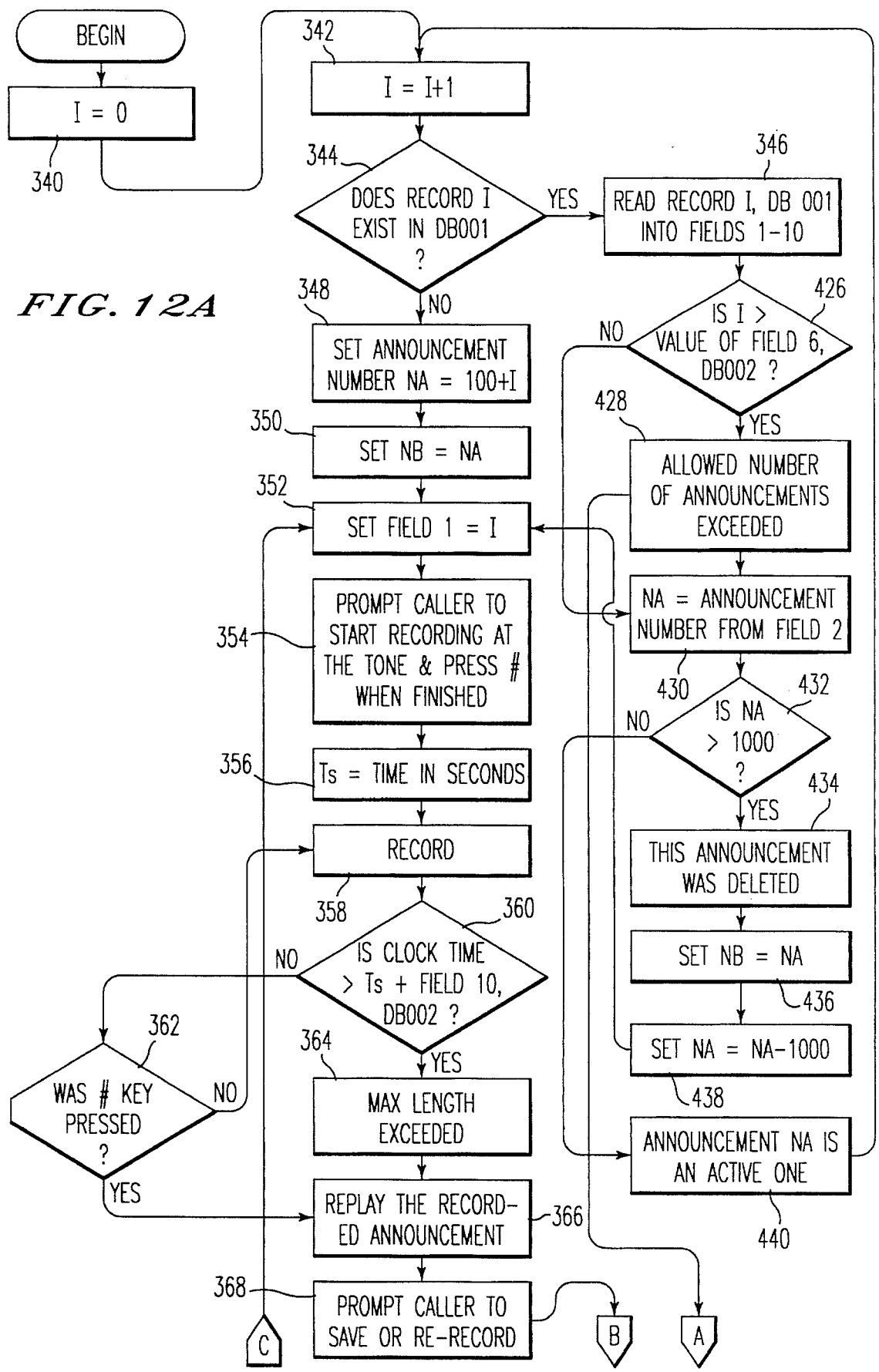
Figure 12B:
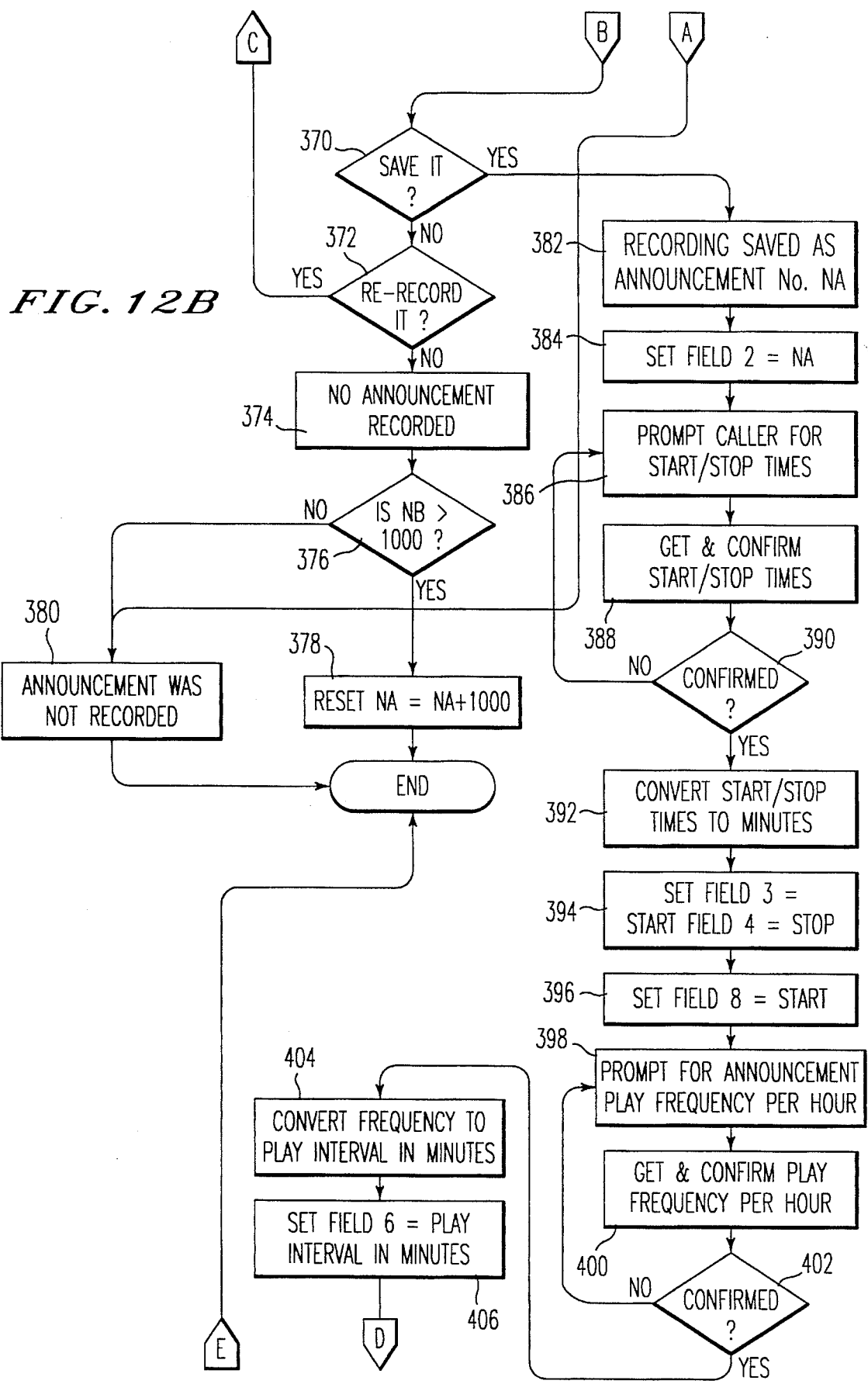
Figure 12C:
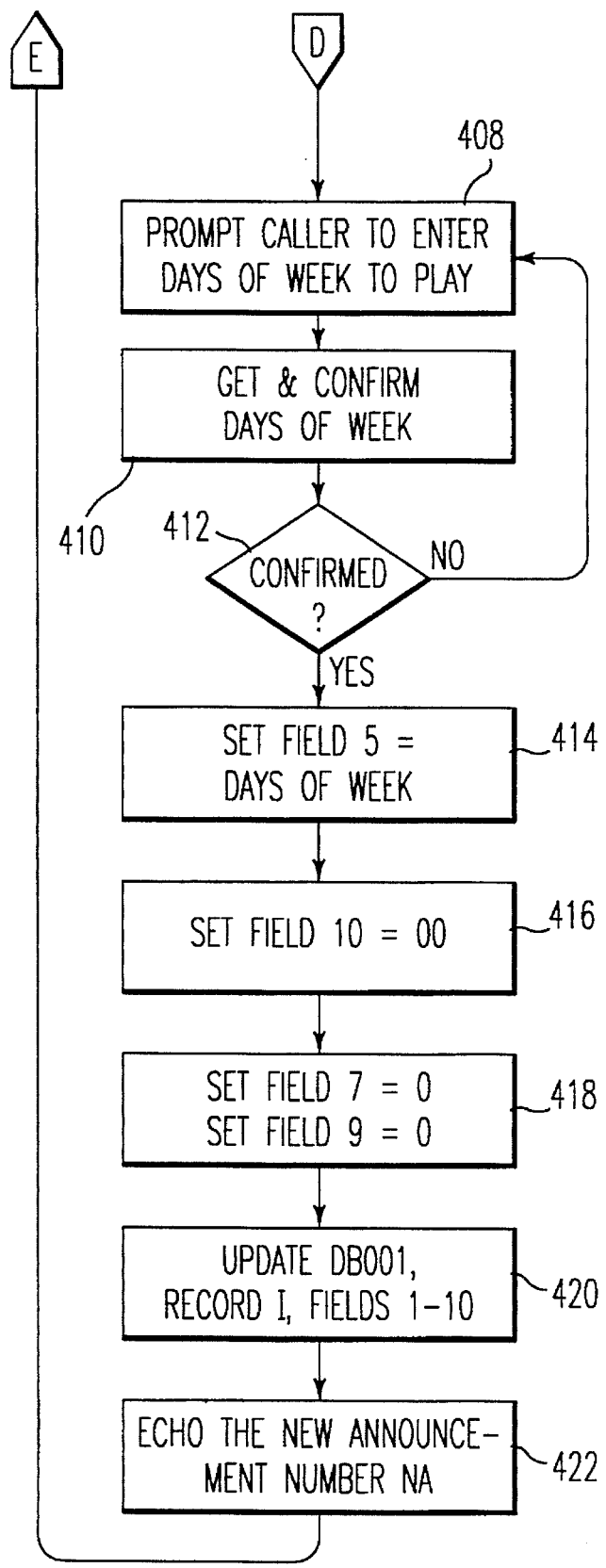

FIG. 12 illustrates the processing events undertaken by the microprocessor in order to record a new announcement. As shown in blocks 340 and 342, the microprocessor sets the variable I to the value 0 and then increments it by 1. The value represents a record number in the database 001. As shown in block 344, the microprocessor examines database 001 to determine if a record with a record number corresponding to the value I exists. If such a record exists, the record is retrieved from the database and stored into a memory buffer for further processing, as indicated in block 346. On the other hand, if the record does not exist in database 001, then the announcement number NA is computed by the microprocessor and a variable NB is set to the same value as NA, as shown in blocks 348 and 350. As shown in block 352, the microprocessor sets the first field of a new record being formed in a memory buffer to the value 1. The microprocessor subsequently prompts the caller to start recording after a tone, which is generated by the telephone interface board over port 50, and to indicate completion of the recording by pressing the pound (#) key on the telephone keypad, as indicated in block 354.

The microprocessor uses a variable TS which is obtained from the PC internal clock and which represents time in seconds, as shown in block 356. The variable TS is incremented as time in seconds elapses on the PC clock. As shown in blocks 358, 360 and 362, the microprocessor stores the caller's recorded message, which is received over port 50 of the telephone interface board, in RAM or on the hard disk until a signal representing the pound sign is detected, or the recording has exceeded the maximum length of time specified in field 10 of database 002. As shown in block 366, the recording process is then terminated, and the microprocessor replays the recorded announcement to the caller. As shown in blocks 368, 370 and 372, the microprocessor plays a message to the caller over port 50 asking the caller if he wishes to save the message or to re-record it. If the caller decides not to save the recorded announcement or to re-record it so that it no longer exceeds the maximum time permitted for recording, no announcement is recorded, and the microprocessor determines whether the variable NB exceeds the value 1000, as shown in blocks 374 and 376. If the variable NB exceeds 1000, the microprocessor resets the variable NA to NA incremented by the value 1000 in order to designate the announcement number as a deleted announcement, the number less 1000 for which can be used again, as shown in 378. If variable NB is less than the value 1000, the announcement is not recorded (block 380), and the number is not reusable. The caller is then prompted to make a selection from the main menu (block 228 of FIG. 10).

With further reference to block 368, if the caller requests re-recording of the announcement, as indicated by the affirmative branch of block 372, the microprocessor proceeds to reset field 1 to the value I and to prompt the caller to begin recording at the tone, shown in blocks 352 and 354. As indicated by the affirmative branch of decision block 370 and block 382, if the caller wishes to save the announcement recorded in block 358, the microprocessor stores the recording on hard disk as announcement number NA. The microprocessor subsequently sets field 2 of the record I corresponding to the saved announcement to the numeral NA, shown in block 384. As shown in blocks 386, 388 and 390, the microprocessor plays a prerecorded message over port 50 to prompt the caller to enter START and STOP times using the telephone keypad and confirms the entered START and STOP times with the caller. The microprocessor converts the entered data into minutes and stores the entered START time into field 3 of the record I and the STOP time in field 4, as indicated by blocks 392, 394 and 396. Similarly, the microprocessor prompts the caller to enter data representing the frequency with which the saved announcement should be played per hour and confirms the entered data with the caller, as indicated in blocks 398, 400 and 402. The microprocessor converts the entered data into a play interval in minutes and stores the play interval in minutes into field 6 of record I, as shown in blocks 404 and 406. The caller is also prompted by the microprocessor to enter the days of the week on which the announcement is to be played as shown in block 408. After the microprocessor confirms the entered data with the caller, the microprocessor stores the data in field 5 of the record corresponding to announcement NA, as indicated in blocks 410, 412 and 414. As indicated in block 416 and 418, the microprocessor sets field 10 to 00 (Table 2) to indicate that the recorded announcement is a regular announcement, and sets fields 7 and 9 to 0 values. The record I with newly entered data in fields 1 through 10 is subsequently stored in database 001. The new announcement number is repeated to the caller, as shown in block 422, before the caller is prompted to make another selection from the menu (block 228 of FIG. 10). The recording of the number consists of a number of standard recordings of spoken words and numerals (e.g., 0 through 19, 20, 30 . . . 100, 1000, etc.). The PC is provided with program code to echo any number by concatenating these standard recordings (e.g., the numeral 1579 is echoed as "one thousand", "five hundred", "and", "seventy-nine").

With further reference to block 346 of FIG. 12, the microprocessor determines from the record I, which has been read from the database 001 into a memory buffer, whether the value I is greater than the value stored in field 6 of database 002, shown in decision block 426. As shown in block 428, if the maximum number of allowed announcements is exceeded, an announcement is not recorded, and the caller is prompted to make another selection from the main menu (block 228 of FIG. 10). If the record number does not exceed the number of announcements permitted in the system, the variable NA is set to equal the announcement number stored in field 2 of record I, as shown in block 430. The microprocessor then determines if a variable NA is greater than the value 1000 as shown in decision block 432. If the variable NA exceeds the value 1000, the announcement has been deleted, and the microprocessor then proceeds to set the variable NB to be equal to NA, as shown in blocks 434 and 436. The microprocessor then decrements the variable NA by 1000, as shown in block 438, so that variable can be used for the recording of a new announcement. With reference to the negative branch of decision block 432, the announcement is recognized as an active one by the microprocessor, as shown in block 440. The microprocessor therefore proceeds to look for another record as indicated by block 442.

Figure 13:
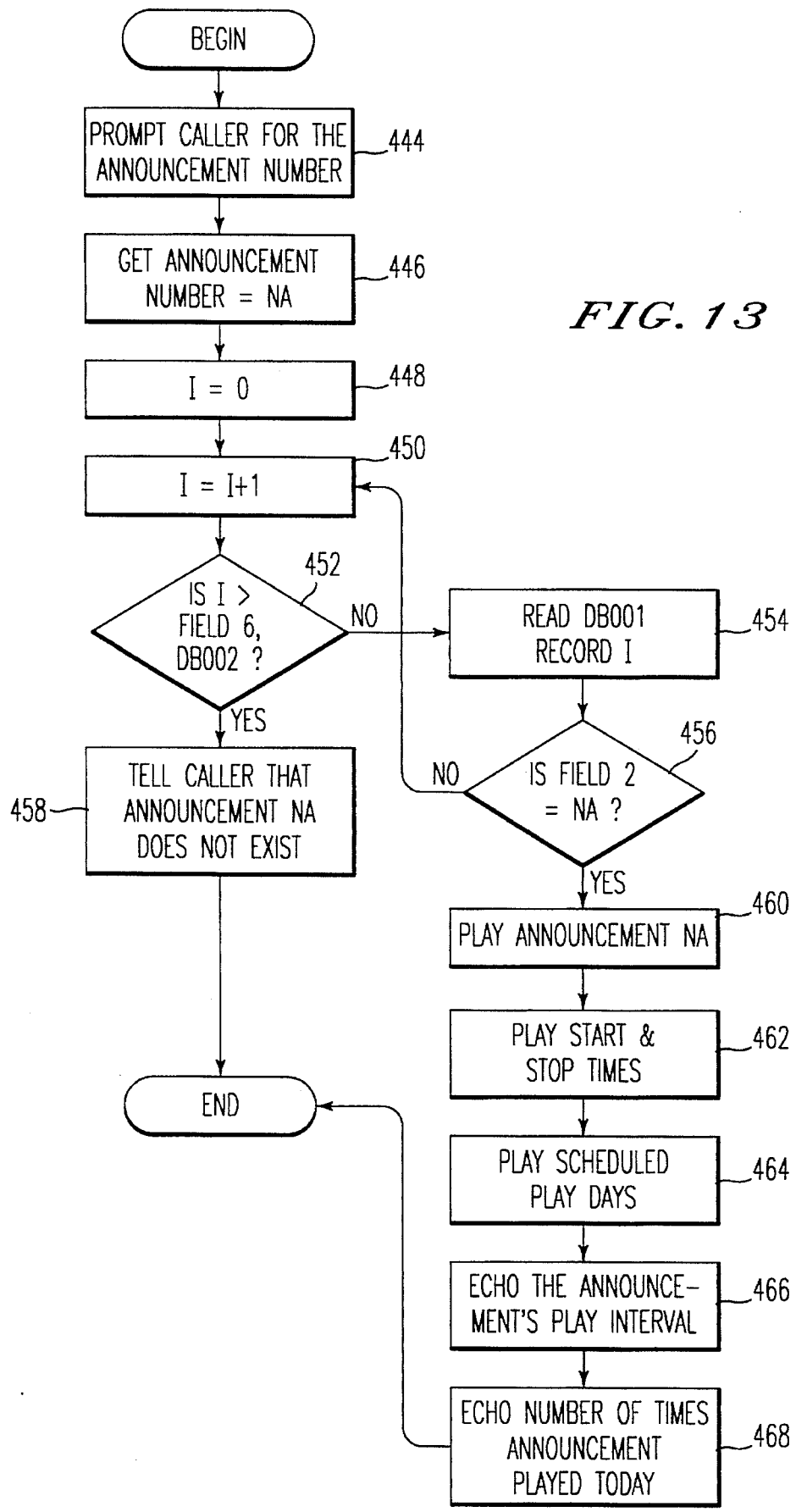

The process for reviewing an announcement (block 236 of FIG. 10) is described in FIG. 13. The microprocessor prompts the caller to enter the announcement number NA of the announcement the caller wishes to review, as shown in block 444. After the microprocessor receives the number entered by the caller over port 50 (block 446), the microprocessor proceeds to set the variable I equal to 0 and then to increment it by one, shown in block 448 and 450. The microprocessor then determines if the value I exceeds the value stored in field 6 of database 002, which represents the maximum number of announcements allowed in the system, as shown in decision block 452. The microprocessor reads record I from the database 002 and determines from that record whether field 2 is equivalent to NA, the value entered by the caller in block 444, as shown in blocks 454 and 456. If field 2 and the number NA entered by the caller are not the same, the microprocessor increments the variable I by the value of 1, as indicated by the negative branch of Decision block 456 and block 450. The microprocessor repeats the process in blocks 450, 452, 454 and 454 until the microprocessor determines that the record corresponding to the newly incremented I (block 450) exceeds the maximum number of announcements entered in field 6 of database 002 or locates the announcement requested for review by the caller. If no record exists for the announcement requested by the caller for review, the microprocessor plays a message using port 50 notifying the caller that his selected announcement number NA does not exist, a shown in block 458, and proceeds to prompt the caller to make another selection from the main menu (block 228 of FIG. 10). When a stored announcement is located which coincides with announcement number NA entered by the caller, the microprocessor plays the announcement over port 50, shown in block 460. The microprocessor plays prerecorded messages notifying the caller of the STOP and START times the scheduled play days and the announcement play interval, as indicated by blocks 462, 464 and 466. The microprocessor informs the caller of the number of times the selected announcement has been played on the current day, as shown in block 268, before prompting the caller to make another selection from the main menu.

Figure 10A:
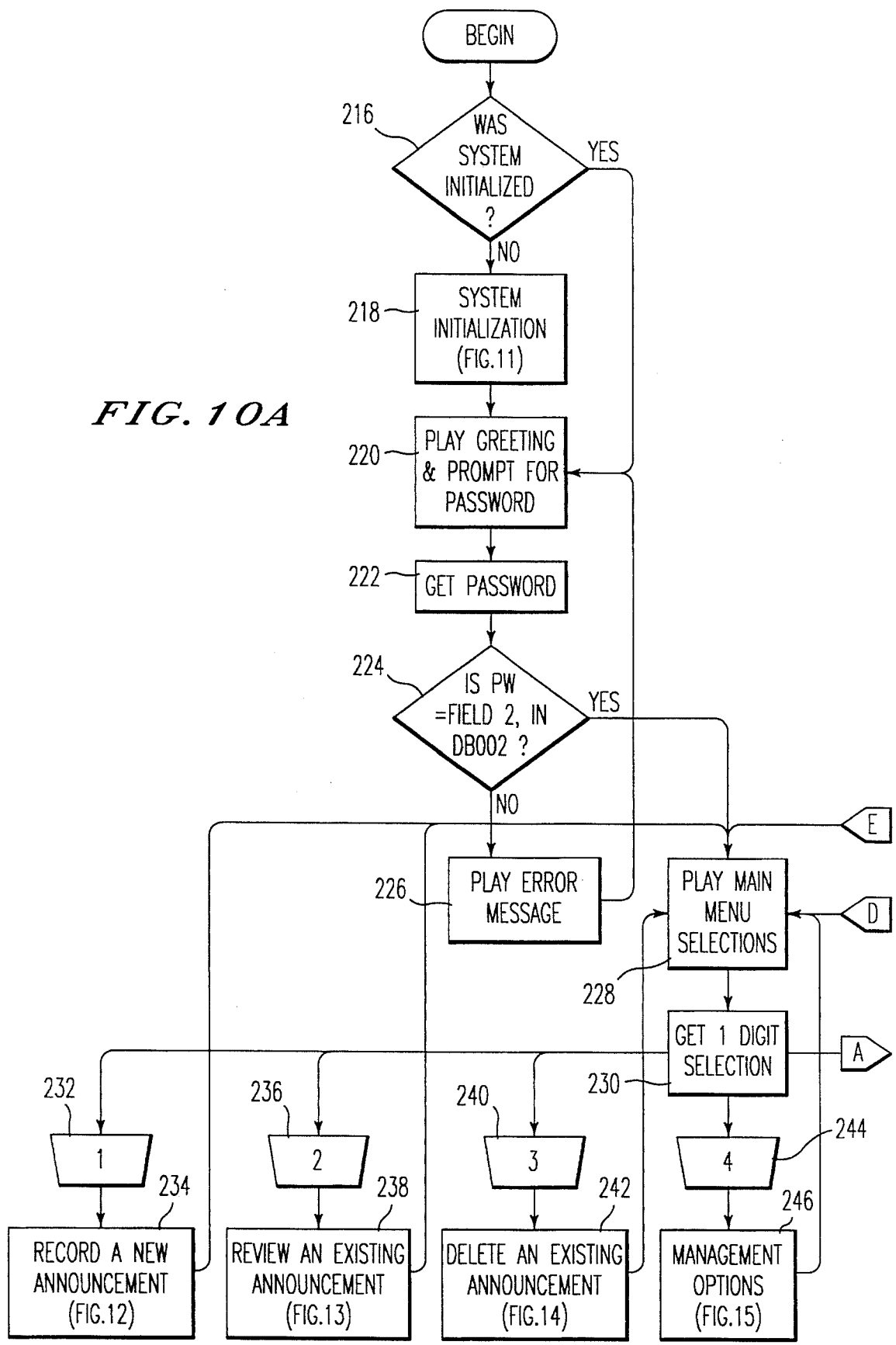
Figure 10B:
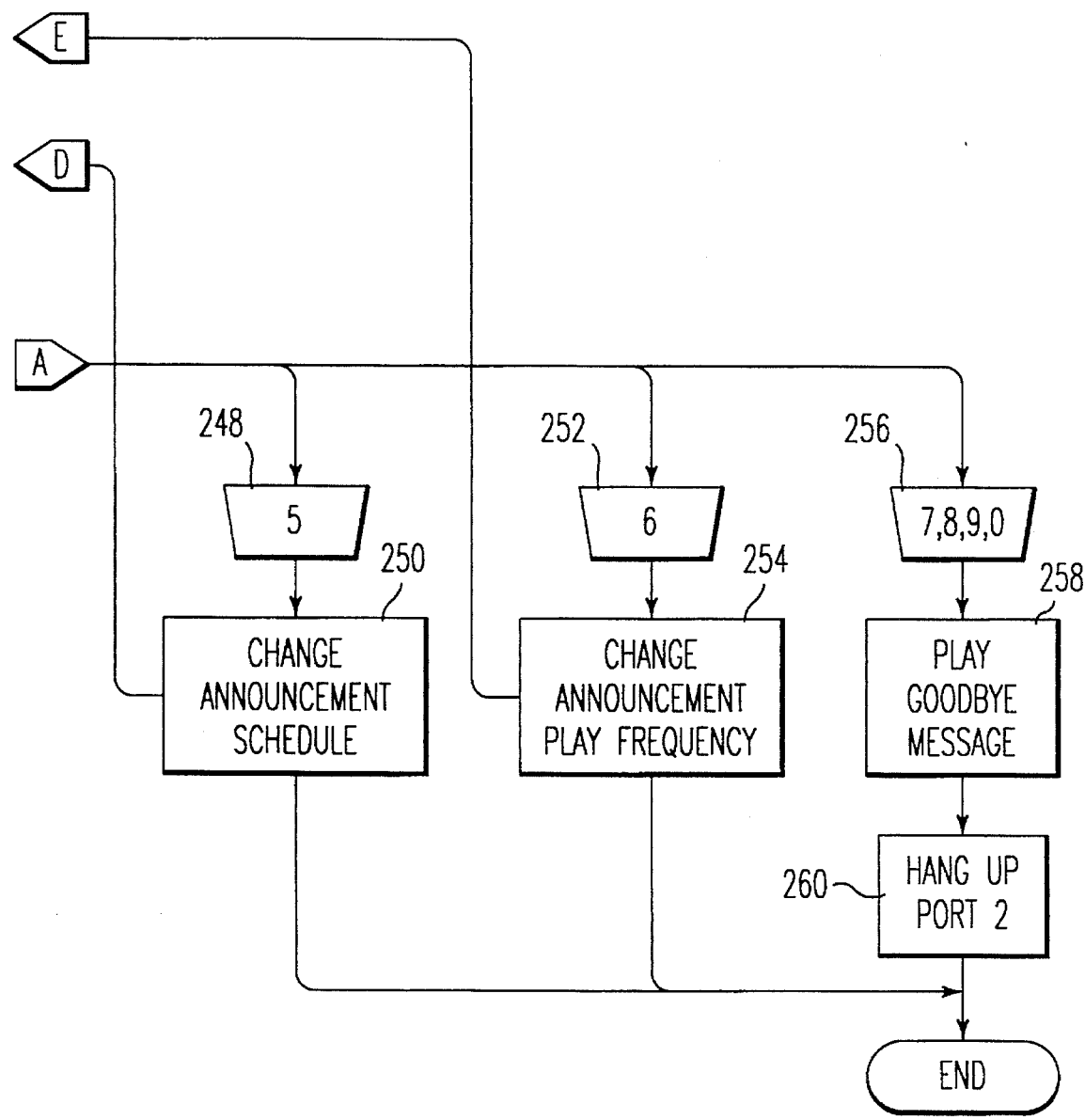
Figure 11A:
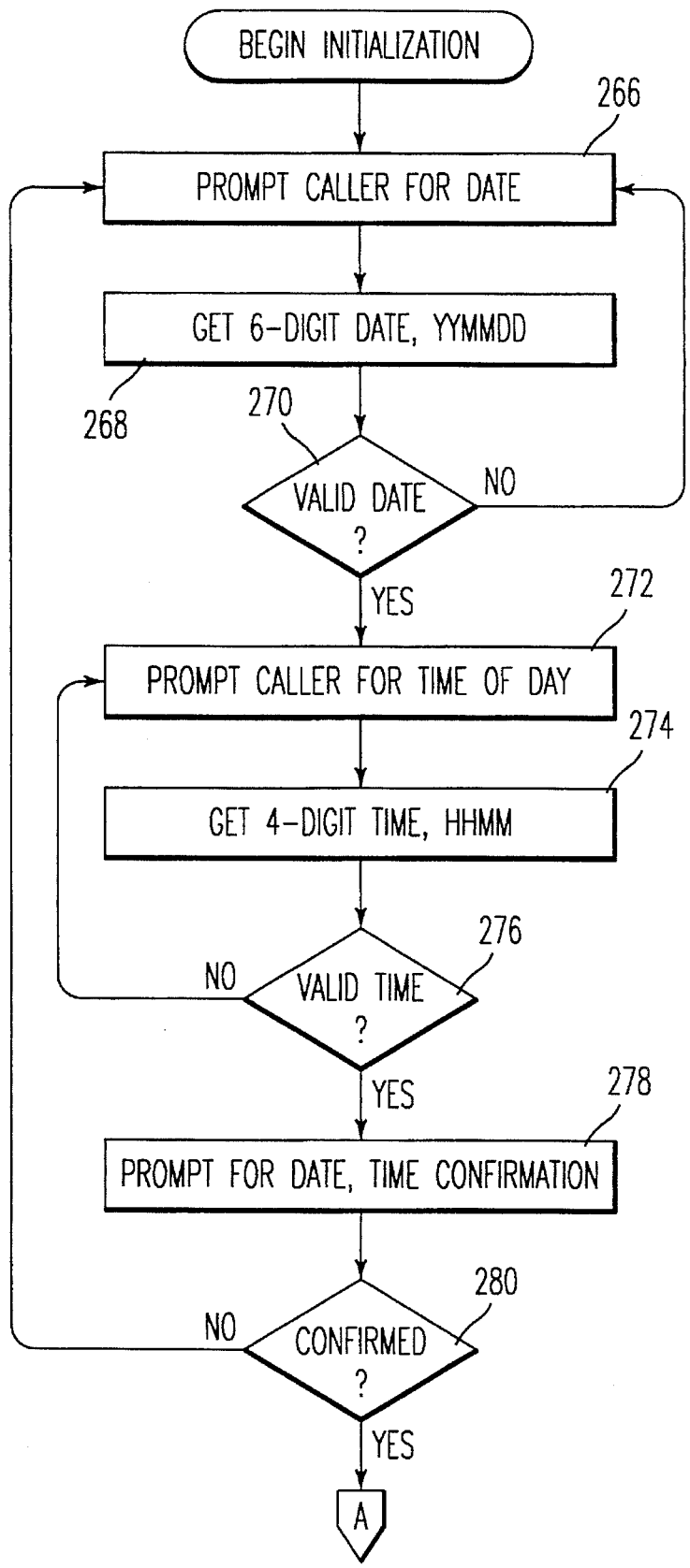
Figure 11B:
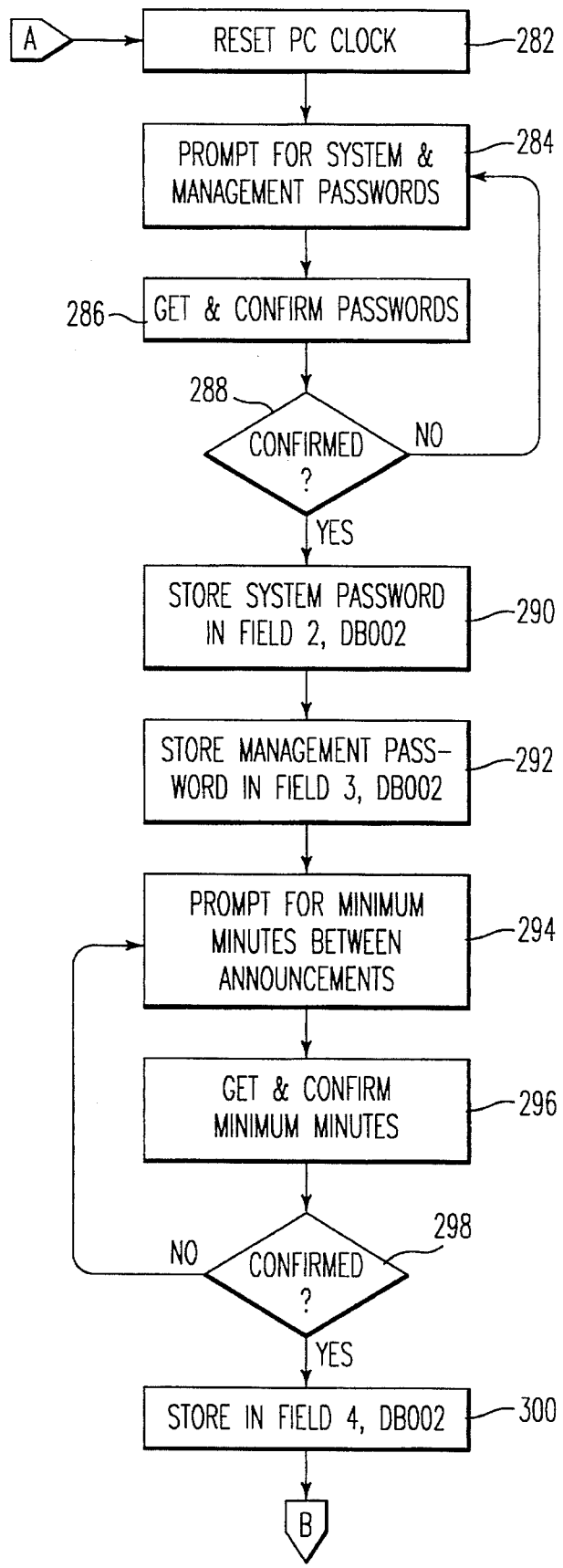
Figure 11C:
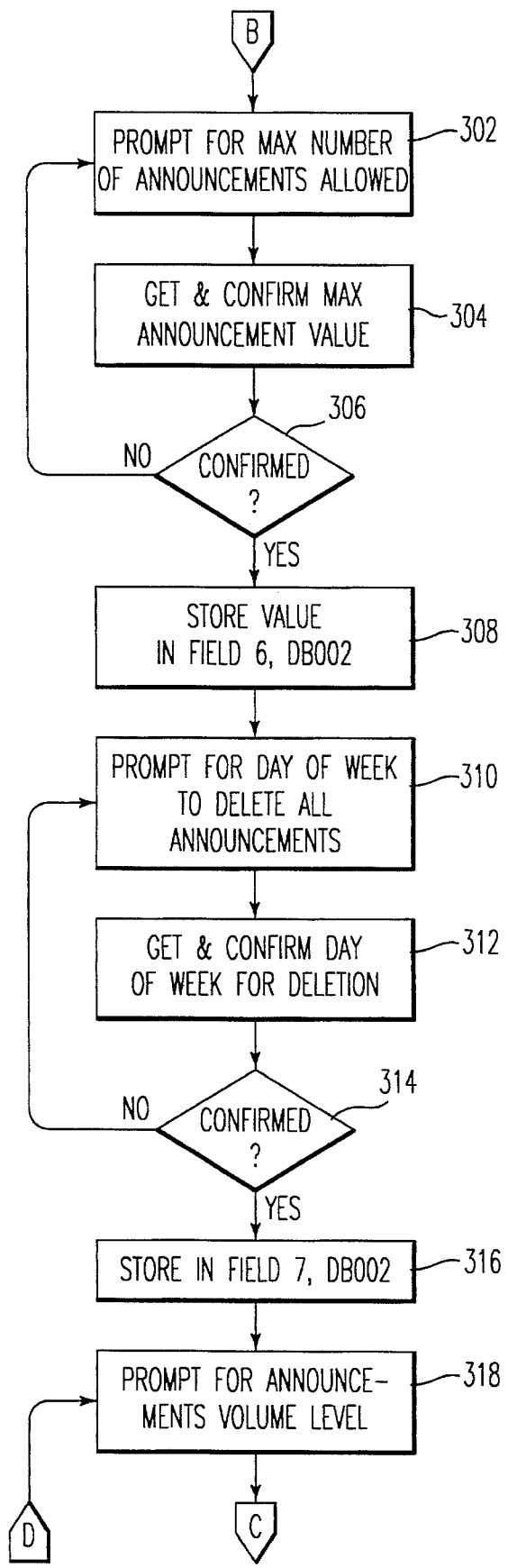
Figure 11D:
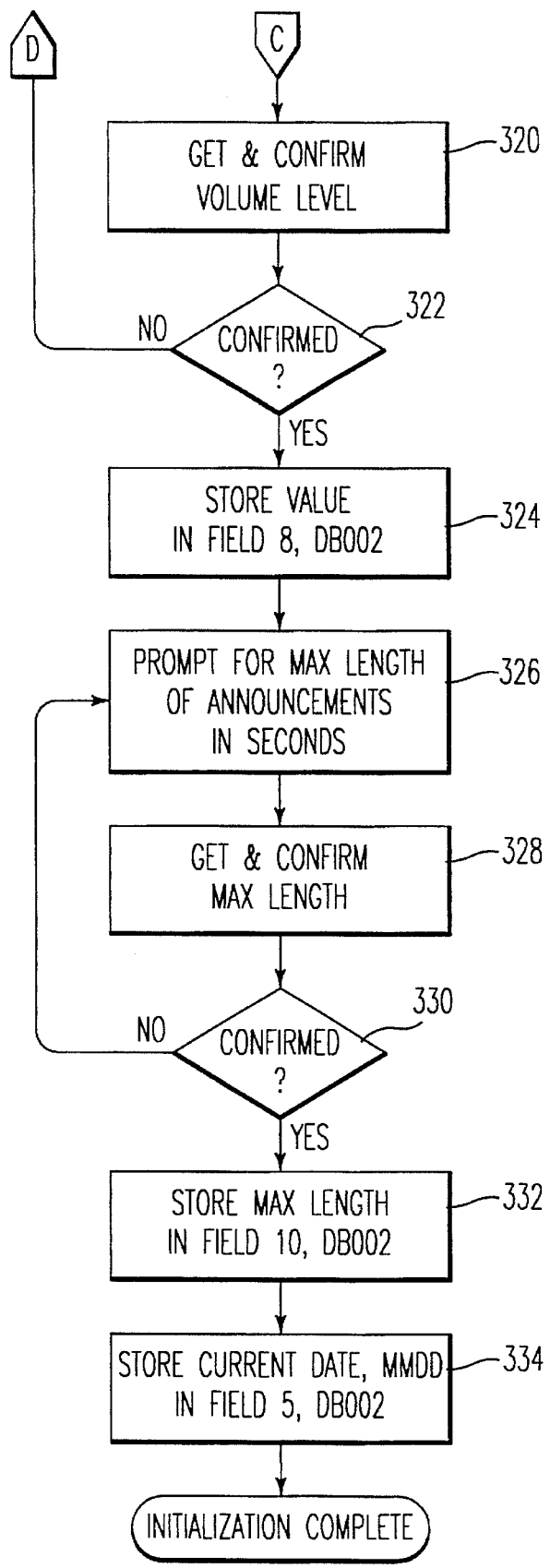
Figure 14A:
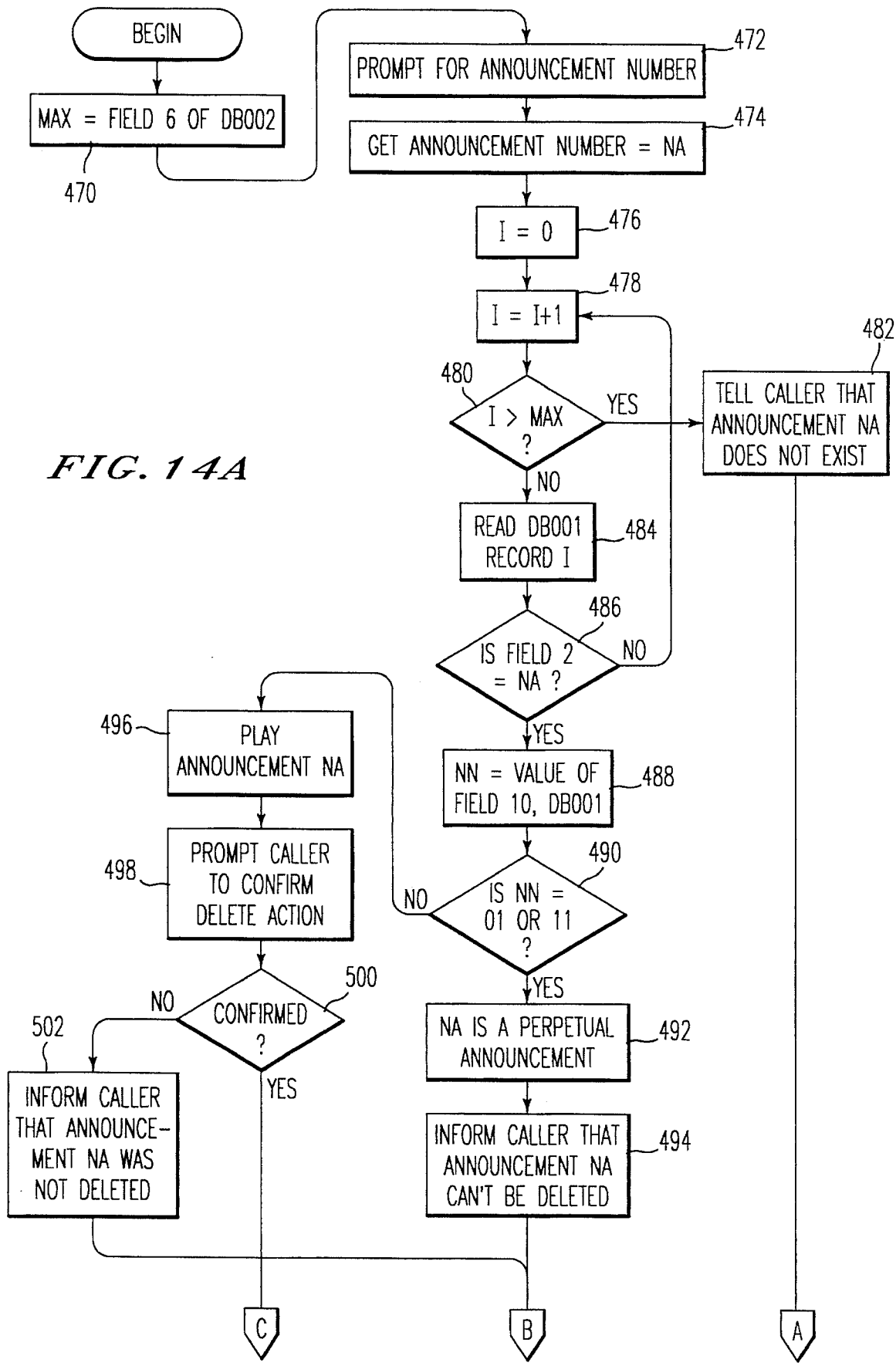
Figure 14B:
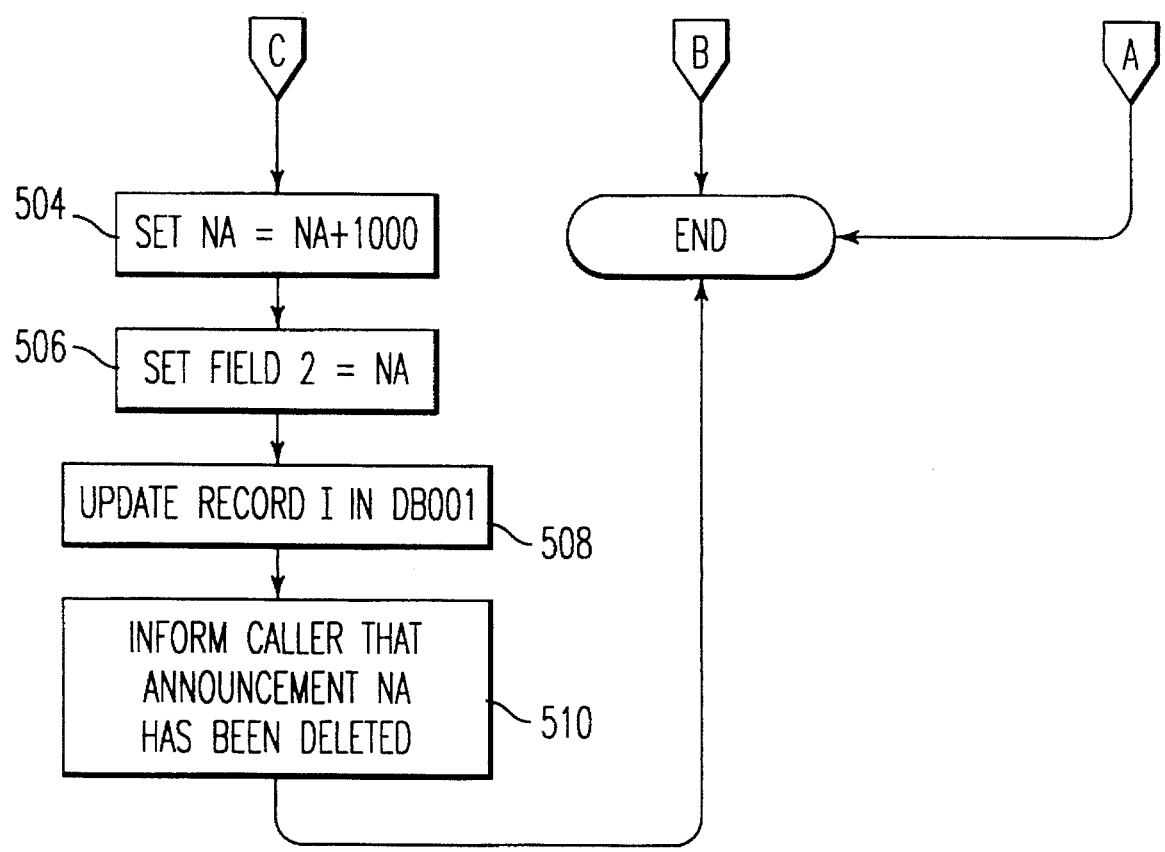

FIG. 14 illustrates the processing events undertaken by the microprocessor to allow a caller to delete an announcement stored on hard disk (blocks 240 and 242 of FIG. 10). The microprocessor begins the process of deleting a selected announcement by setting a variable MAX equal to the number stored in field 6 of the database 002, shown in block 470. As shown in block 472, the microprocessor plays a message via port 50 of the telephone interface board which prompts the caller to enter the number of the announcement the caller wishes to delete using DTMF signals or voice input. After the microprocessor receives the announcement number NA from the caller, as shown in block 474, the microprocessor sets a variable I equal to the value of 0 (block 476) and then subsequently increments the variable I by one, as shown in block 478. The microprocessor proceeds to determine whether the variable I is greater than the variable MAX as shown in decision block 480. As indicated by the affirmative branch of decision block 480, if the variable I is greater than the variable MAX, the microprocessor plays a message via port 50 which notifies the caller that the entered announcement number NA does not exist, as shown in block 482, and subsequently prompts the caller to make another selection from the main menu (block 228 of FIG. 10). If an announcement corresponding to the record I exists in database 001, the record I is read from the database into a memory buffer for further processing, as shown in block 484. The microprocessor compares the data contained in field 2 of record I with the number NA entered by the caller, as shown in decision block 486. If the numbers are different, the microprocessor increments the variable I by the value one; otherwise, the microprocessor sets a variable NN equal to the value of the number stored in field 10 of database 002 which corresponds to the maximum length in seconds allowed for an announcement, as indicated in block 488. With reference to decision block 490 and block 492, the microprocessor determines whether the variable NN is equal to the value of 01 or value 11. If NN is equivalent to either of these values, the announcement NA is perpetual announcement. The microprocessor proceeds to play a message which informs the caller via port 50 that the announcement he selected cannot be deleted, as indicated by block 494. The microprocessor then instructs the caller to make another selection from the main menu (block 228 of FIG. 10).

As indicated by the negative branch of decision block 490 and by block 496, the microprocessor proceeds to play the announcement NA selected by the caller if it is not a perpetual announcement. The microprocessor then prompts the caller to confirm his request to delete the selected announcement NA as shown in blocks 498 and 500. If the caller decides not to delete the selected announcement, the microprocessor plays a message via port 50 informing the caller that the announcement NA was not deleted, as indicated in block 502. As shown in blocks 504 and 506, the microprocessor increments the value of variable NA by 1000 and then sets field 2 of the record I to the numerical value NA after the message is deleted from RAM. As shown in blocks 508 and 510, the microprocessor updates record I in database 001 to reflect the change in field 2 and then plays a prerecorded message to inform the caller that the announcement he selected was deleted.

Figure 15A:
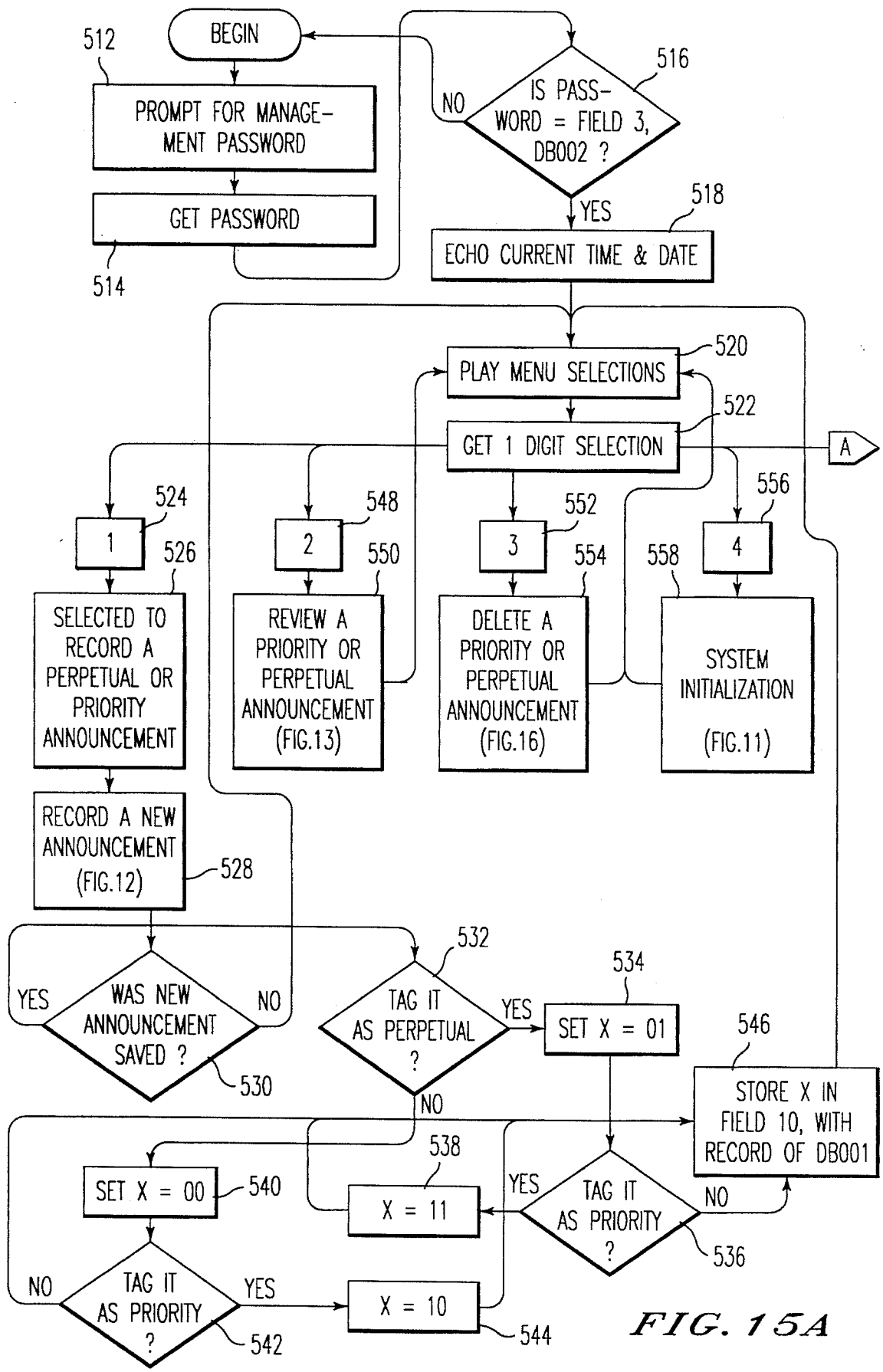
Figure 15B:
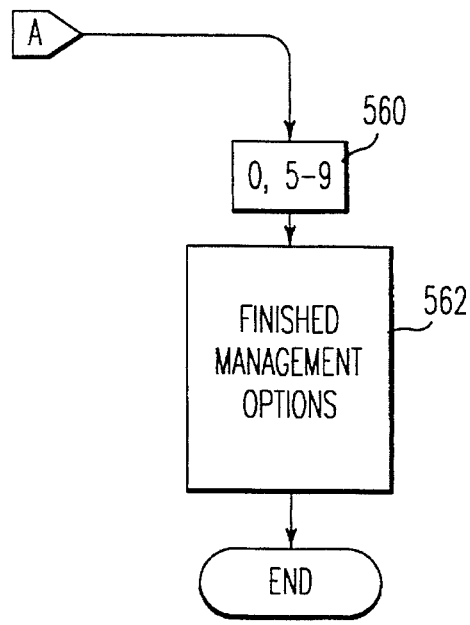

FIG. 15 illustrates the processing events by which the PC is used to provide a system administrator with a number of management options. As shown in block 512, the microprocessor plays a message to the caller via port 50 which prompts the caller to enter a management password on his telephone keypad. As shown in blocks 514 and 516, the microprocessor compares the entered password with field 3 of database 002. If the entered password and the stored password are different, the caller is prompted again to enter a management password by the microprocessor, as indicated by the negative branch of decision block 516. Once a correct management password is entered, the microprocessor plays the current time and date over port 50, as indicated by block 518. The microprocessor then plays a message which provides the caller with a menu of selections from which the caller can choose by voice input or entering a single digit on the telephone keypad, as shown in blocks 520 and 522.

With continued reference to FIG. 15, the caller can select from the menu in block 520 to record a perpetual or priority announcement by entering the digit 1 on his keypad, as indicated by blocks 524 and 526. A perpetual announcement (e.g., a generic message such as "welcome to our store.") is a message which cannot be deleted automatically by a caller via port 50 and a telephone 30 (FIG. 14). Only a system administrator can remove the message from the hard disk. A priority announcement is always played before a regular announcement in the event of a scheduling conflict between the two types of announcements. The priority announcement can also be a perpetual announcement depending on how it is designated in field 10 of its record in database 001. Like the perpetual-type announcement, only a system administrator can delete a priority or a priority/perpetual-type announcement, as described in connection with FIGS. 15 and 16.

The microprocessor records a new announcement in the manner described in connection with FIG. 12 as shown in block 528. With reference to block 530, after the new announcement is saved, the caller has the option of designating the new announcement as a regular announcement, a perpetual announcement, a priority announcement or a perpetual and priority announcement (see field 10 of database 001 in Table 2). If a caller wishes the new announcement to be designated a perpetual announcement, the caller enters the value 01 on his keypad. This value is then used to define a variable X, as indicated by the affirmative branch of decision block 532 and block 534. If the caller wishes the new announcement to be perpetual and a priority announcement, the caller enters the digits 11 on his keypad. The microprocessor, upon receiving these digits, proceeds to set the variable X to the value 11, as indicated by the affirmative branch of block 536 and block 538. If the caller wishes the new announcement to be a regular announcement, that is, neither a priority announcement nor a perpetual announcement, the caller enters the digits 00. These value are then used by the microprocessor to set the variable X to the value 00, as indicated by the negative branch of block 532, block 540, and by the negative branch of decision block 542. Finally, if the caller wishes the announcement to be only a priority announcement and not a perpetual announcement, the caller enters the values 10 using his keypad. The microprocessor proceeds to set the variable X to the value 10, as shown by the affirmative branch of block 542 and block 544. Once the value of the variable X is set in accordance with the caller's demands, the variable X is then stored in field 10 of record I in database 001, as indicated by block 546.

With reference to blocks 548 and 550, if the caller wishes to review a priority or perpetual announcement, the caller can enter a 2 on his keypad. The microprocessor, upon receiving the caller's selection, permits the caller to review a selected announcement in accordance with FIG. 13. As shown in blocks 552 and 554, the caller can choose to delete a priority or perpetual announcement by entering the numerical value 3 on his telephone keypad. The microprocessor subsequently processes the caller's request in accordance with the processing events described below in connection with FIG. 16. If the caller selects item 4 from the menu, the system will undergo initialization in accordance with the flow chart in FIG. 11, as indicated by blocks 556 and 558. If the caller enters a 0 or numerical values other than 1 through 4, the microprocessor is programmed to play a good-bye message informing the caller that there are no further management options, as indicated by block 560.

Figure 16B:
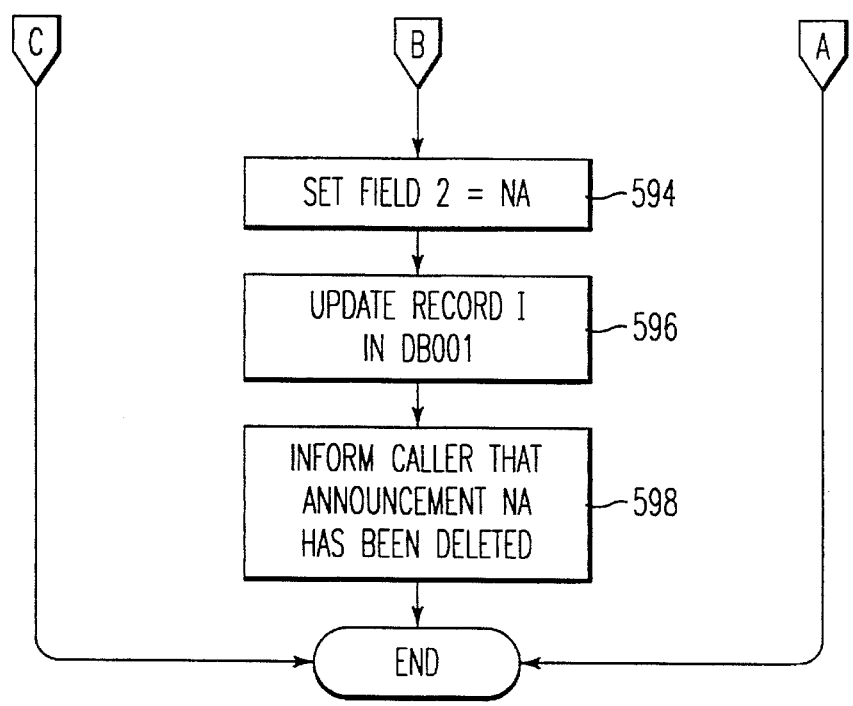
Figure 16A:
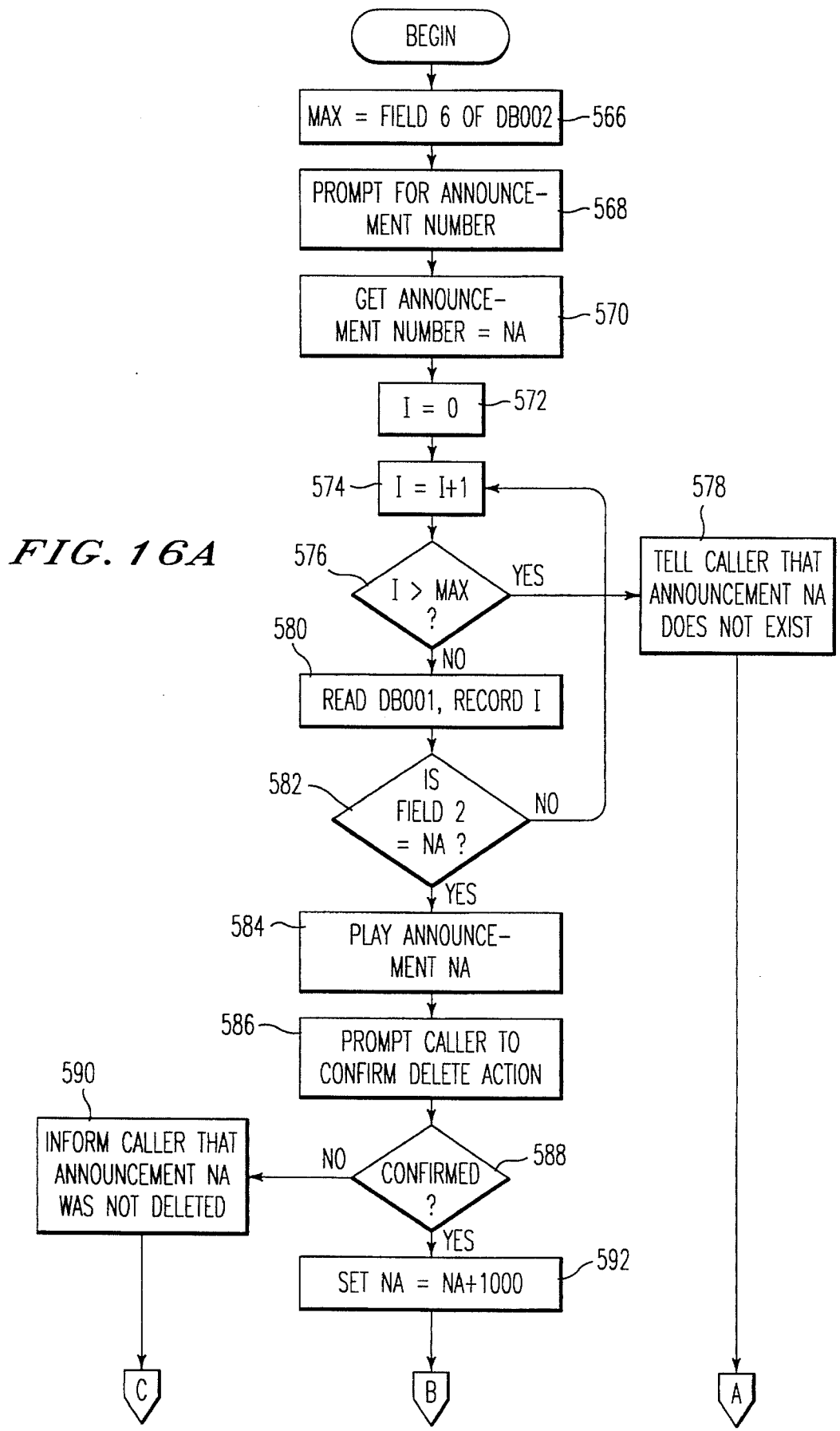

The automated announcement system of the present invention deletes a priority and/or perpetual announcement in accordance with the processing events illustrated in FIG. 16. Blocks 566, 568, 570, 572, 574, 576, 578, 580 and 582 are identical, respectively, to the blocks 470 through 486 described above in connection with FIG. 14. With reference to block 584, once the microprocessor determines that the announcement number NA selected by the caller is the same as field 2 in record I, the microprocessor plays the announcement corresponding to record I over port 50. The microprocessor then plays a message to the caller via port 50 which confirms that the caller wishes to delete the selected announcement, as indicated by block 586. If the caller does not wish the selected announcement to be deleted, the microprocessor plays a prerecorded message to the caller via port 50 notifying the caller that the announcement was not deleted, as indicated by the negative branch of decision block 588 and block 590. If the caller confirms deletion of the selected announcement, the microprocessor proceeds to delete the selected announcement from the hard disk and to increment the value NA by the value 1000, thereby designating the announcement corresponding to record I as a deleted announcement in field 2, as shown in blocks 592 and 594. The microprocessor updates record I in database 001 and then plays a message to the caller indicating that the selected announcement was deleted, as shown in blocks 596 and 598.

The automated announcement system of the present invention is advantageous for a number of reasons. The system provides flexibility in recording, scheduling and modifying messages to be played over a public address system. Further, the system design allows a person to record a number of voice messages via a local telephone set, a local PBX, or a remote telephone line. After each message is recorded, the system plays messages to the caller asking for confirmation via DTMF signaling or speech input, as well as for data representing the desired message play schedule (i.e., STOP and START times) and play frequency. Further, the system requires the caller to enter passwords in order to perform certain system functions. These functions can be performed simultaneously by more than one user by accessing more than one inbound telephone line.

In addition to inbound telephone ports for message recording and modification, the system also includes one or more outbound telephone ports which are connected either directly to a public address speaker system or indirectly via a PBX. During operation, the system is programmed to continuously check its internal clock to determine if it is time to play a recorded message. If a message is scheduled for play, the system can command an outbound port to go off-hook in order to transmit the message to the public address speaker system. The system can start playing the message once the audio path between the PC and the public address amplifier and speaker is established, even while a user is recording or modifying messages on an inbound port. Finally, the system PC is programmed to prioritize the recorded messages, taking into account the play schedule created by the caller or system administrator, to ensure that no message is subjected to a substantial play deficit.

The foregoing detailed description is illustrative of various preferred embodiments in the present invention. It will be appreciated that numerous variations and changes can be made thereto without departing from the scope of the invention as defined in the accompanying claims.

What is claimed is:

1. An automated announcement system for playing messages, comprising:

storage means for storing a plurality of messages and at least one schedule for playing said messages;

input means for inputting said messages and said schedule to said storage means;

an output device for playing selected ones of said messages; and programmable control means coupled to said storage means, said input means and said output device for receiving said messages and said schedule from said input means, for storing said messages and said schedule in said storage means, and for selecting individual ones of said messages for playing by said output device in accordance with said schedule, said programmable control device being operable to play said messages other than in accordance with said schedule in order to maintain a predetermined minimum interval between messages played by said output device.

2. An automated announcement system as claimed in claim 1, wherein said schedule comprises a desired play frequency for each of said messages beginning at a desired start time, said play frequency and start time being independently selectable for each of said messages.

3. An automated announcement system as claimed in claim 1, wherein said programmable control means is operable to temporarily inhibit the playing of messages by said output device in order to maintain said predetermined minimum interval.

4. An automated announcement system as claimed in claim 1, wherein the length of said predetermined minimum interval is selectively variable.

5. An announcement system as claimed in claim 1, wherein said output device is an audio device.

6. An announcement system as claimed in claim 1, wherein said output device is a display device.

7. A method for playing messages, comprising the steps of:

inputting and storing first and second messages;

inputting and storing a schedule for playing said first and second messages;

playing said first message in accordance with said schedule;

in the event that said schedule requires said second message to be played within a predetermined minimum interval following the playing of said first message, inhibiting the playing of said second message; and in the event that said schedule does not require said second message to be played until said predetermined minimum interval has expired, playing said second message.

8. A method for playing messages as claimed in claim 7, wherein at least one of said playing steps comprises the step of playing said message on an audio output device.

9. A method for playing messages as claimed in claim 7, where said one of said playing steps comprises the step of displaying said message on a display device.

10. A method for playing messages as claimed in claim 7, where said inhibiting of the playing of said second message is effective only for the duration of said predetermined minimum interval, said second message being made available for playing following the expiration of said interval.

11. A method for playing messages as claimed in claim 7, wherein said schedule comprises a desired play frequency for each of said first and second messages beginning at a desired start time, said play frequency and start time being independently selected for each of said first and second messages.

12. A method for playing messages as claimed in claim 7, further comprising the step of varying the length of said predetermined minimum interval.

13. An automated announcement system for playing messages, comprising:

storage means for storing a plurality of messages and at least one schedule for playing said messages;

input means for inputting said messages and said schedule to said storage means;

an output device for playing selected ones of said messages; and programmable control means coupled to said storage means, said input means and said output device for selecting individual ones of said messages for playing by said output device in accordance with said schedule, said programmable control means being operable to establish a priority between conflicting messages scheduled to be played at the same time and to selectively play or inhibit the playing of said conflicting messages in accordance with said priority.

14. An automated announcement system as claimed in claim 13, wherein said programmable control means establishes said priority based on the number of times each of said conflicting messages has already been played.

15. An automated announcement system as claimed in claim 13, wherein at least one of said messages is designated a priority message and is played before another one of said messages when scheduled play times for said messages conflict.

16. An automated announcement system as claimed in claim 13, wherein said programmable control means establishes said priority based on relative deficits in the number of times each of said conflicting messages has already been played as compared with the number of times each of said conflicting messages would have been played in the absence of other conflicting messages.

17. An automated announcement system as claimed in claim 16, wherein said schedule includes a desired play frequency for each of said messages and a desired minimum interval between messages played by said output device.

18. A method for playing messages, comprising the steps of:

inputting and storing a plurality of messages;

inputting and storing a schedule for playing said messages;

periodically reviewing said schedule to determine whether one or more messages are to be played;

in the event that said schedule requires only one message to be played, playing said message; and in the event that said schedule requires more than one message to be played, establishing a priority between or among conflicting messages and selectively playing or inhibiting the playing of said conflicting messages in accordance with said priority.

19. A method for playing messages as claimed in claim 18, wherein the step of establishing a priority between or among conflicting messages includes the steps of:

determining the number of times each of said conflicting messages has already been played; and establishing said priority based on said determination.

20. A method for playing messages as claimed in claim 18, wherein the step of establishing a priority between or among conflicting messages includes the steps of:

determining the number of times each of said conflicting messages has already been played;

determining the number of times each of said conflicting messages would have been played in the absence of other conflicting messages; and establishing said priority based on relative deficits in the number of times each of said conflicting has already been played as compared with the number of times each of said conflicting messages would have been played in the absence of other conflicting messages.

21. A method for playing messages as claimed in claim 20, wherein said relative deficits are computed as ratios between the number of times each of said conflicting messages has already been played and the number of times each of said conflicting messages would have been played in the absence of other conflicting messages, and wherein the step of establishing said priority based on said relative deficits comprises the steps of comparing said ratios and selecting for playing the one of said conflicting messages having the lowest ratio.

22. An automated announcement system for playing messages, comprising:

storage means for storing a plurality of messages and volume level data relating to said messages;

input means for inputting said messages and said volume level data to said storage means;

an output device for playing said messages at a controllable volume level; and programmable control means coupled to said storage means and said output device for selecting said messages for playing by said output device and for controlling said volume level in accordance with said volume level data.

23. An automated announcement system as claimed in claim 22, wherein at least a portion of said storage means comprises a magnetic storage device for storing said messages in digital form.

24. An automated announcement system as claimed in claim 22, wherein said volume level data is the same for all messages stored in said storage means.

25. A method for playing a message, comprising the steps of:

inputting and storing a message;

inputting and storing volume level data relating to said message;

retrieving said stored message;

retrieving said stored volume level data; and playing said message at a volume level determined by said retrieved volume level data.

26. A method for playing a message, comprising the steps of:

storing a message;

storing volume level data relating to said message;

retrieving said stored message;

retrieving said stored volume level data;

playing said message at a volume level determined by said retrieved volume level data; and modifying said stored volume level data.

27. A method for playing a message as claimed in claim 26, wherein said modifying step comprises the steps of modifying said stored volume level data in accordance with a group of parameters comprising the day and the time of day, and changing said volume level in accordance with said modified volume level data.

28. A method for playing a message as claimed in claim 26, wherein said modifying step comprises the steps of determining the approximate number of people for whom said message is being played, modifying said stored volume level data in accordance with said number of people, and changing said volume level in accordance with said modified volume level data.

29. A method for playing a message as claimed in claim 26, wherein said modifying step comprises the steps of determining an approximate ambient noise level in the area within which said message is played, modifying said stored volume level data in accordance with said ambient noise level, and changing said volume level in accordance with said modified volume level data.

30. A method for playing as claimed in claim 25, further comprising the steps of inputting, storing and retrieving an additional message and playing said additional message at the same volume level determined by said stored volume level data.

31. An automated announcement system for playing messages, comprising:

storage means for storing a plurality of messages and desired scheduling parameters for playing said messages, said scheduling parameters including a plurality of first scheduling parameters which are respectively applicable to individual ones of said messages and a second scheduling parameter which is applicable to all of said messages;

an output device for playing selected ones of said messages; and programmable control means coupled to said storage means and to said output device for selecting individual ones of said messages for playing by said output device in accordance with said first and second scheduling parameters.

32. An automated announcement system as claimed in claim 31, wherein at least one of said first scheduling parameters is selected from the group consisting of a daily start time, a daily stop time, an announcement repeat interval, and a weekly schedule.

33. An automated announcement system as claimed in claim 31, wherein said second scheduling parameter is selected from the group consisting of a required minimum interval between messages played, a maximum daily number of messages played, a day of the week for deleting messages played on a weekly schedule, and a maximum allowable duration for each message.

34. An automated announcement system as claimed in claim 31, further comprising an input device coupled to said programmable control means for inputting said first and second groups of scheduling parameters for storage in said storage means.

35. An automated announcement system as claimed in claim 34, wherein said input device comprises a telephone set, said telephone set also being operable to allow messages to be input for storage in said storage means.

36. A method for playing messages, comprising the steps of:

storing a plurality of messages;

storing a plurality of first scheduling parameters which are respectively applicable to individual ones of said messages;

storing a second scheduling parameter which is applicable to all of said messages; and playing said messages in accordance with said first and second scheduling parameters.

37. A method for playing messages as claimed in claim 36, wherein at least one of said first scheduling parameters is selected from the group consisting of a daily start time, a daily stop time, an announcement repeat interval, and a weekly schedule.

38. A method for playing messages as claimed in claim 36, wherein said second scheduling parameter is selected from the group consisting of a required minimum interval between messages played, a maximum daily number of messages played, a day of the week for deleting messages played on a weekly schedule, and a maximum allowable duration for each message.

39. A method for playing messages as claimed in claim 36, further comprising the step of modifying at least one of said first and said second scheduling parameters.

40. A method for playing messages as claimed in claim 36, further comprising the step of recording a message for storage using a telephone set.

41. An automated announcement system for playing messages, comprising:
a storage device for storing a plurality of messages;
an output device for playing selected ones of said messages;
a programmable control device coupled to said storage device and to said output device for selecting individual ones of said messages for playing by said output device; and
an input device coupled to said programmable control device for programming said control device using control commands and passwords;
wherein said programmable control device is responsive to at least first and second different control commands and to at least first and second different passwords, said first control command being recognized by said control device only after said first password has been entered using said input device and said second control command being recognized by said control device only after said second password has been entered using said input device.

42. An automated announcement system as claimed in claim 41, wherein said first control command is selected from the group consisting of recording a message, reviewing an existing message, deleting an existing message, changing a message play schedule, and changing a message play frequency.

43. An automated announcement system as claimed in claim 42, wherein said second control command is selected from the group consisting of recording a perpetual or priority message, reviewing a perpetual or priority message, deleting a perpetual or priority message, and supplying system initialization data.

44. An automated announcement system as claimed in claim 41, wherein said second control command in recognized by said control device only after both of said first and second passwords have been entered using said input device.

45. An automated announcement system as claimed in claim 44, wherein said first control command is a general system function and said second control command is a reserved management function.

46. A method for playing messages, comprising the steps of:
recording and storing a plurality of messages;
inputting a first password and a first control command enabled by said first password;
inputting a second password and a second control command enabled by said second password but not by said first password, said second password being different from said first password and said second control command being different from said first control command; and
playing selected ones of said messages in accordance with said first and second control commands.

47. A method for playing messages as claimed in claim 46, wherein said first control command is selected from the group consisting of recording a message, reviewing an existing message, deleting an existing message, changing a message play schedule, and changing a message play frequency.

48. A method for playing messages as claimed in claim 47, wherein said second control command is selected from the group consisting of recording a perpetual or priority message, reviewing a perpetual or priority message, deleting a perpetual or priority message, and supplying system initialization data.

49. A method for playing messages as claimed in claim 46, wherein said second control command is recognized only after both of said first and second passwords have been input.

50. A method for playing messages as claimed in claim 49, wherein said first control command is a general system function and said second control command is a reserved management function.

51. An announcement system for playing messages, comprising:
a storage device for storing a plurality of messages;
an output device for playing selected ones of said messages;
a control device coupled to said storage device and to said output device for selecting individual ones of said messages for playing by said output device;
a microphone coupled to said output device for allowing a live announcement to be made using said output device; and
an interface circuit connected between said microphone and said control device for inhibiting the playing of a message when said microphone is in use.

52. An announcement system as claimed in claim 51, wherein said interface circuit comprises a current sensing circuit for sensing the current flowing between said microphone and said output device.

53. An announcement system as claimed in claim 52, wherein said current sensing circuit comprises an opto-isolator.

54. A method for playing a message through an output device having a microphone for making live announcements, comprising the steps of:
storing a message;
playing said message in accordance with a predetermined schedule;
detecting when said microphone is in use; and
inhibiting the playing of said message when said microphone is in use.

55. A method for playing a message as claimed in claim 54, wherein the step of detecting when said microphone is in use is carried out by detecting the current flowing between the microphone and the output device.

56. A method for playing a recorded audio message as claimed in claim 54, further comprising the step of resetting said schedule for said inhibited audio message.

* * * * *